United States Patent
Iwasaki et al.

(10) Patent No.: US 9,360,919 B2
(45) Date of Patent: Jun. 7, 2016

(54) PREPARING PROCESSING AND INPUT UNITS OF A COMPUTING DEVICE FOR A POWER TRANSITION BEFORE THE TRANSITION OCCURS

(71) Applicants: Ryo Iwasaki, Kanagawa (JP); Reiji Yukumoto, Kanagawa (JP); Yoshifumi Kawai, Kanagawa (JP); Hiroshi Maeda, Kanagawa (JP); Daigo Uchiyama, Kanagawa (JP)

(72) Inventors: Ryo Iwasaki, Kanagawa (JP); Reiji Yukumoto, Kanagawa (JP); Yoshifumi Kawai, Kanagawa (JP); Hiroshi Maeda, Kanagawa (JP); Daigo Uchiyama, Kanagawa (JP)

(73) Assignee: RICOH COMPANY, LTD., Tokyo (JP)

( * ) Notice: Subject to any disclaimer, the term of this patent is extended or adjusted under 35 U.S.C. 154(b) by 253 days.

(21) Appl. No.: 13/730,098

(22) Filed: Dec. 28, 2012

(65) Prior Publication Data
US 2013/0179708 A1   Jul. 11, 2013

(30) Foreign Application Priority Data
Jan. 5, 2012   (JP) .............................. 2012-000761

(51) Int. Cl.
G06F 1/32   (2006.01)

(52) U.S. Cl.
CPC ............ *G06F 1/3234* (2013.01); *G06F 1/3203* (2013.01)

(58) Field of Classification Search
CPC ...... G06F 9/526; G06F 1/3203; G06F 1/3234
USPC ....................................................... 713/320
See application file for complete search history.

(56) References Cited

U.S. PATENT DOCUMENTS

| | | | | |
|---|---|---|---|---|
| 5,721,935 A | * | 2/1998 | DeSchepper | G06F 1/3203 710/311 |
| 5,925,132 A | * | 7/1999 | Kadokura | G06F 1/24 713/310 |
| 6,407,734 B1 | * | 6/2002 | Komine et al. | 345/212 |
| 6,625,740 B1 | * | 9/2003 | Datar et al. | 713/324 |
| 7,283,163 B1 | * | 10/2007 | Noda | 348/243 |

(Continued)

FOREIGN PATENT DOCUMENTS

| | | |
|---|---|---|
| CN | 101512527 A | 8/2009 |
| JP | 2000-261515 | 9/2000 |
| JP | 2001-265174 | 9/2001 |

OTHER PUBLICATIONS

Office Action issued Mar. 1, 2016 in Chinese Patent Application No. 2013100007650 (with English Translation).

*Primary Examiner* — Thomas Lee
*Assistant Examiner* — Santosh R Poudel
(74) *Attorney, Agent, or Firm* — Oblon, McClelland, Maier & Neustadt, L.L.P

(57) ABSTRACT

A processing device includes a plurality of input units configured to input a process request; a plurality of processing units configured to execute a process corresponding to the process request input by the plurality of input units; a power control unit configured to transfer the processing device into a power saving state and to transfer the processing device back to a regular state from the power saving state; and an operation suppression control unit configured to send an operation suppression request to the plurality of input units and the plurality of processing units before the power control unit transfers the processing device into the power saving state, and to send an operation suppression release request to the plurality of input units and the plurality of processing units when the power control unit transfers the processing device back to the regular state from the power saving state.

18 Claims, 33 Drawing Sheets

(56) References Cited

U.S. PATENT DOCUMENTS

| | | | |
|---|---|---|---|
| 7,685,439 B2* | 3/2010 | Drescher | 713/300 |
| 7,843,589 B2* | 11/2010 | Tanimoto | 358/1.15 |
| 8,122,233 B2* | 2/2012 | Ozawa et al. | 713/1 |
| 2002/0078391 A1* | 6/2002 | Yeh | 713/322 |
| 2003/0097493 A1* | 5/2003 | Weast | G06F 3/0601 710/5 |
| 2005/0012776 A1* | 1/2005 | Kato et al. | 347/23 |
| 2007/0260794 A1* | 11/2007 | Ashish et al. | 710/267 |
| 2007/0300093 A1* | 12/2007 | Oteki et al. | 713/323 |
| 2007/0300262 A1* | 12/2007 | Kim | G11B 27/034 725/58 |
| 2008/0034242 A1* | 2/2008 | Ishikura et al. | 713/323 |
| 2008/0068238 A1* | 3/2008 | Bell et al. | 341/139 |
| 2008/0178261 A1* | 7/2008 | Yao et al. | 726/2 |
| 2008/0304099 A1* | 12/2008 | Yamada | 358/1.15 |
| 2010/0083273 A1* | 4/2010 | Sihn et al. | 718/104 |
| 2010/0103955 A1* | 4/2010 | Biederman et al. | 370/503 |
| 2010/0165083 A1* | 7/2010 | Sasaki et al. | 348/51 |
| 2010/0250988 A1* | 9/2010 | Okuda et al. | 713/323 |
| 2011/0009173 A1* | 1/2011 | Kumamoto | 455/574 |
| 2011/0213992 A1* | 9/2011 | Satsangi et al. | 713/300 |
| 2011/0255129 A1* | 10/2011 | Tamura | 358/1.15 |
| 2012/0046767 A1* | 2/2012 | Shimohata et al. | 700/91 |

* cited by examiner

| POWER STATE | RECEIPT OF REQUEST |
|---|---|
| ON | POSSIBLE |
| ACTIVE STANDBY | PARTIALLY POSSIBLE |
| STANDBY | POSSIBLE ONLY FOR POWER ON |
| OFF | NOT POSSIBLE |

FIG.12

| MODULE | WHETHER OPERATION SUPPRESSION TARGET |
|---|---|
| FUNCTION EXECUTING UNIT 15 | YES |
| FUNCTION EXECUTING UNIT 16 | YES |
| FUNCTION EXECUTING UNIT 17 | NO |

FIG.13

| FUNCTION | WHETHER TO COMPLETE EXECUTION OR CANCEL |
|---|---|
| FUNCTION A | COMPLETE |
| FUNCTION B | CANCEL |
| FUNCTION C | COMPLETE |
| FUNCTION D | COMPLETE |

FIG.14

| MODULE | WHETHER OPERATION SUPPRESSION TARGET | ORDER OF OPERATION SUPPRESSION | ORDER OF OPERATION SUPPRESSION RELEASE |
|---|---|---|---|
| USER OPERATION RECEIVING UNIT 12 | YES | 1 | 3 |
| NETWORK COMMUNICATION UNIT 13 | YES | 1 | 2 |
| FUNCTION EXECUTING UNIT 15 | YES | 2 | 1 |
| FUNCTION EXECUTING UNIT 16 | NO | — | — |

FIG.16

| MODULE | WHETHER OPERATION SUPPRESSION TARGET | |
| --- | --- | --- |
| | ACTIVE STANDBY | STANDBY |
| FUNCTION EXECUTING UNIT 15 | YES | YES |
| FUNCTION EXECUTING UNIT 16 | NO | YES |
| FUNCTION EXECUTING UNIT 17 | NO | NO |

FIG.17

| FUNCTION | ACTIVE STANDBY | STANDBY |
|---|---|---|
| FUNCTION A | POSSIBLE TO EXECUTE | NOT POSSIBLE TO EXECUTE |
| FUNCTION B | POSSIBLE TO EXECUTE | NOT POSSIBLE TO EXECUTE |
| FUNCTION C | NOT POSSIBLE TO EXECUTE | NOT POSSIBLE TO EXECUTE |
| FUNCTION D | NOT POSSIBLE TO EXECUTE | NOT POSSIBLE TO EXECUTE |

FIG.21

| FUNCTION | ACTIVE STANDBY | STANDBY |
|---|---|---|
| FUNCTION A | EXECUTE | IGNORE |
| FUNCTION B | ACCUMULATE IN QUEUE | IGNORE |
| FUNCTION C | ACCUMULATE IN QUEUE | IGNORE |
| FUNCTION D | IGNORE | IGNORE |

FIG.27

| MESSAGE TYPE | MESSAGE CONTENTS | POSSIBILITY OF CANCELLING |
|---|---|---|
| 1 | SETTING VALUE UPDATE REPORT | NO |
| 2 | SAVE SETTING VALUE | NO |
| 3 | READ SETTING VALUE | NO |
| 4 | SAVE/DELETE CERTIFICATE | NO |
| 5 | READ CERTIFICATE | NO |
| 6 | ACQUIRE SUBSYSTEM STATE | NO |
| 7 | NETWORK TRANSMISSION | YES |
| 8 | NETWORK RECEPTION | YES |
| 9 | USER REPORT | NO |
| 10 | SHARE UI OPERATION | NO |

FIG.28

| MESSAGE TYPE | THREAD ID | JOB STATE | RECEIVER |
|---|---|---|---|
| 4 | 9 | RECEIVING RESPONSE | SETTING CONTROL UNIT 57 |
| 7 | 4 | SENDING REQUEST | IMAGE FILE ACQUIRING UNIT 55 |
| 8 | 1 | RECEIVING REQUEST | IMAGE FILE RECEIVING UNIT 56 |
| 5 | 8 | RECEIVING RESPONSE | SETTING CONTROL UNIT 57 |
| 8 | 2 | SENDING RESPONSE | IMAGE FILE RECEIVING UNIT 56 |

FIG.29

| THREAD ID | PURPOSE | STATE | USER |
|---|---|---|---|
| 1 | HTTP SERVER | RECEIVING | IMAGE FILE RECEIVING UNIT 56 |
| 2 | HTTP SERVER | SENDING | IMAGE FILE RECEIVING UNIT 56 |
| 3 | HTTP CLIENT | WAITING | — |
| 4 | HTTP CLIENT | SENDING | IMAGE FILE ACQUIRING UNIT 55 |

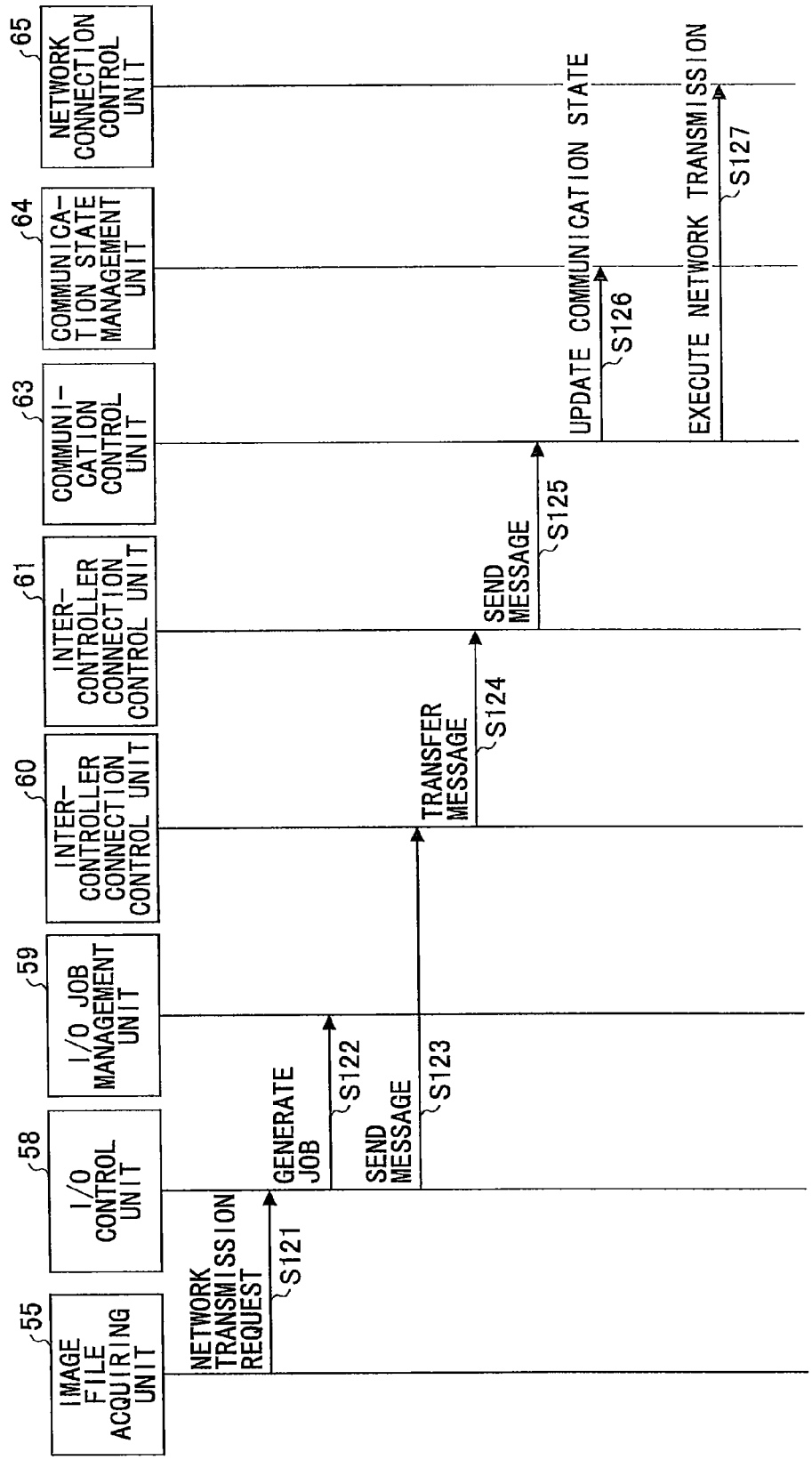

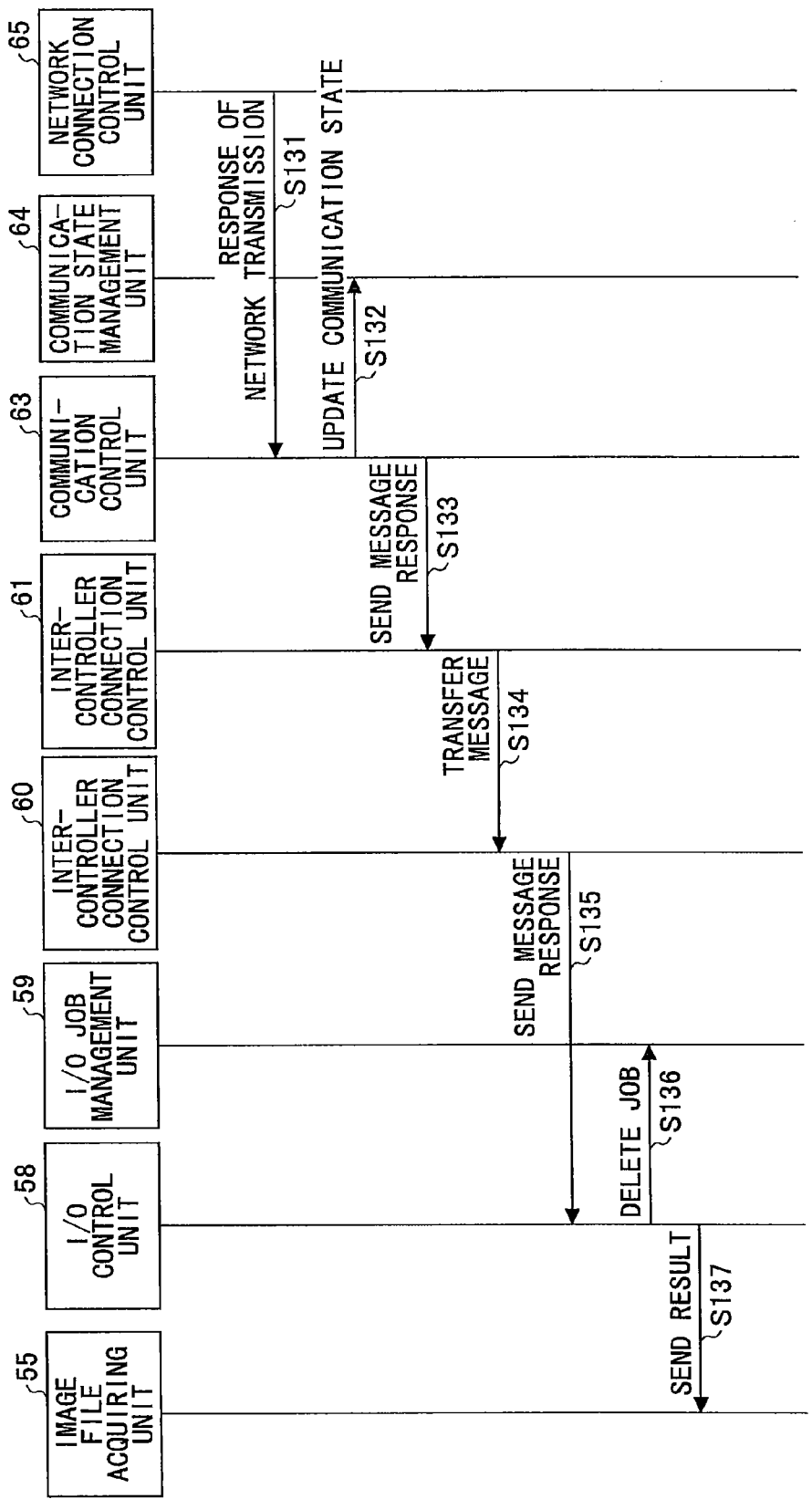

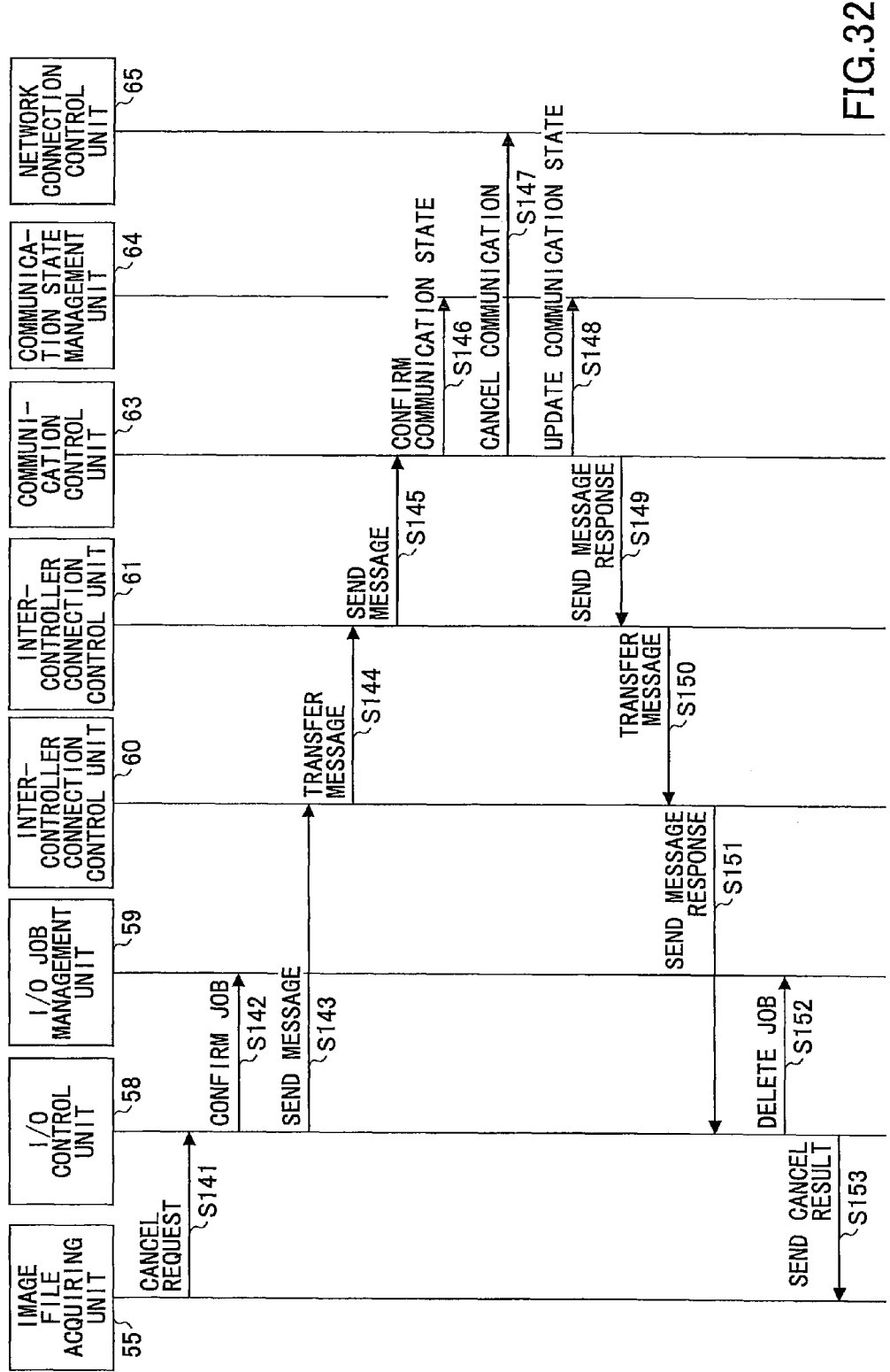

FIG.35

| MESSAGE TYPE | JOB STATE | POSSIBILITY OF CANCELLING |
|---|---|---|
| 7 | SENDING REQUEST | YES |
| 7 | WAITING FOR RESPONSE | YES |
| 7 | RECEIVING RESPONSE | YES |
| 8 | WAITING FOR REQUEST | YES |
| 8 | RECEIVING REQUEST | YES |
| 8 | SENDING RESPONSE | NO |

FIG.36

| PURPOSE | STATE | POSSIBILITY OF CANCELLING |
|---|---|---|
| HTTP SERVER | WAITING | NO |
| HTTP SERVER | RECEIVING | YES |
| HTTP SERVER | SENDING | NO |
| HTTP CLIENT | WAITING | NO |
| HTTP CLIENT | SENDING | YES |
| HTTP CLIENT | RECEIVING | YES |

PREPARING PROCESSING AND INPUT UNITS OF A COMPUTING DEVICE FOR A POWER TRANSITION BEFORE THE TRANSITION OCCURS

BACKGROUND OF THE INVENTION

1. Field of the Invention

The present invention relates to a processing device of a projector, a facsimile machine, a scanner, a printer, a copier, and a multifunction peripheral, etc.

2. Description of the Related Art

In recent years, a processing device of a projector, a facsimile machine, a scanner, a printer, a copier, and a multifunction peripheral, etc., has a function for transferring to an energy saving state (also referred to as a "power saving state") that is a standby state, for the purpose of reducing power consumption.

Conventionally, there is a processing device that displays a message saying that the device will transfer to a standby state after completing a job being executed, when a standby transfer request is received while executing a function (see, for example, patent document 1).

However, by the standby transfer method, the conventional processing device cannot transfer to a standby state when a request to use the function is received during the process of transferring to the standby state. In this case, it takes time to transfer to the standby state.

Furthermore, in the standby state, power consumption is reduced by stopping unnecessary power supply to the device. Therefore, when an attempt is made to transfer to the standby state while executing a function, a failure may occur.

Patent Document 1: Japanese Laid-Open Patent Publication No. 2000-261515

SUMMARY OF THE INVENTION

The present invention provides a processing device, in which one or more of the above-described disadvantages are eliminated.

A preferred embodiment of the present invention provides a processing device, which is capable of preventing failures caused when the processing device transfers to a power saving state while a function is being executed, and capable of quickly transferring to a power saving state without receiving new requests while transferring to a power saving state.

According to an aspect of the present invention, there is provided a processing device including a plurality of input units configured to input a process request; a plurality of processing units configured to execute a process corresponding to the process request input by the plurality of input units; a power control unit configured to transfer the processing device into a power saving state and to transfer the processing device back to a regular state from the power saving state; and an operation suppression control unit configured to send an operation suppression request to the plurality of input units and the plurality of processing units before the power control unit transfers the processing device into the power saving state, and to send an operation suppression release request to the plurality of input units and the plurality of processing units when the power control unit transfers the processing device back to the regular state from the power saving state.

BRIEF DESCRIPTION OF THE DRAWINGS

Other objects, features and advantages of the present invention will become more apparent from the following detailed description when read in conjunction with the accompanying drawings, in which:

FIG. 12 illustrates an example of a table held by the operation suppression control unit shown in FIG. 1, indicating whether a module is an operation suppression target;

FIG. 13 illustrates an example of a table held by the modules of the projector shown in FIG. 1 that are operation suppression targets, indicating process contents to be executed when an operation suppression request is received;

FIG. 14 illustrates a table held by the operation suppression control unit shown in FIG. 1, indicating whether modules are operation suppression targets, the order of implementing operation suppression, and the order of releasing operation suppression;

FIG. 16 illustrates an example of a table held by the operation suppression control unit shown in FIG. 1 indicating whether modules are operation suppression targets, in which information pertinent to "active standby" and information pertinent to "regular standby" are held separately;

FIG. 17 illustrates an example of a table held by a module shown in FIG. 1 that is an operation suppression target, indicating whether functions can be executed in an active standby state and a regular standby state;

FIG. 21 illustrates an example of a table held by the module of the projector shown in FIG. 1 that is an operation suppression target, indicating how to process each request during operation suppression;

FIG. 27 illustrates an example of a table held by the I/O job management unit shown in FIG. 25, including information indicating whether it is possible to cancel message types;

FIG. 28 illustrates an example of a table held by the I/O job management unit shown in FIG. 25, for managing jobs;

FIG. 29 illustrates an example of a thread state management table held by the communication state management unit shown in FIG. 26;

FIG. 30 is a sequence diagram illustrating a process performed until generating a job, performed by the projector shown in FIG. 24;

FIG. 31 is a sequence diagram illustrating a process performed until deleting a job performed by the projector shown in FIG. 24;

FIG. 32 is a sequence diagram illustrating a process performed until deletion of a job by cancelling the job, performed by the projector shown in FIG. 24;

FIG. 35 illustrates an example of a table stored and held by the I/O job management unit shown in FIG. 25, indicating whether cancelling is possible in the respective job states; and FIG. 36 illustrates an example of a table stored and held by the communication control unit shown in FIG. 26, indicating whether cancelling is possible according to the purpose and state of the communication thread.

DETAILED DESCRIPTION OF THE PREFERRED EMBODIMENTS

A description is given, with reference to the accompanying drawings, of embodiments of the present invention.

Figures 2, 3:
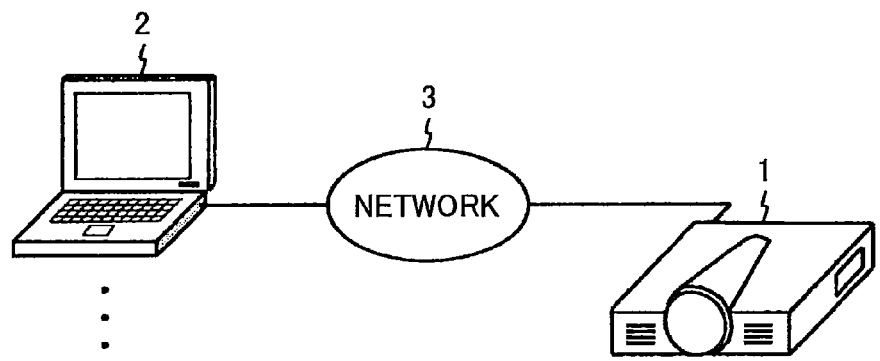
FIG. 2 illustrates a configuration of a projection system according to an embodiment of the present invention.
FIG. 3 illustrates an example of a table indicating the respective power states of the projector shown in FIG. 1 and contents of requests received in the respective power states at the projector.

FIG. 2 illustrates a configuration of a projection system according to an embodiment of the present invention.

In the projection system, a plurality of personal computers including a PC 2 are connected to a projector 1 that is an example of a processing device via a wired or wireless network 3. The PC 2 and the projector 1 can perform data communication with each other. PCs other than the PC 2 are not shown.

The projector 1 is a video projection device (also referred to as an "image projection device"), and projects videos based on projection data input from the PC 2 on a projection surface such as a screen.

The PC 2 transmits video data to the projector 1.

In the projection system having the above configuration, plural PCs including the PC 2 share the projector 1 and can cause the projector 1 to project videos that are respectively held by the PCs including the PC 2.

The projection system of FIG. 2 is one example; in another example, another video output device or an external storage may be further connected to the projection system.

When a request is made to transfer the power state of the projector 1, from an on state to a standby state, while a process is being executed inside the projector 1, and the power state is transferred to a standby state while the process is being executed, a failure may occur the next time the projector is started up.

A standby state is a power saving state for reducing the power consumption by stopping the power supply to part of the inside of the projector 1.

The projector 1 has two types of standby states, i.e., "active standby" and "regular standby". These states are described in detail below.

The projector 1 according to the present embodiment performs the following operation suppression before transferring to a standby state, in order to prevent the projector 1 from transferring to a standby state while a process is being executed.

Operation Suppression

1. With regard to a process request that is received before receiving a request to transfer to a standby state, the corresponding process is ended.
2. A process request received after receiving a request to transfer to a standby state is not executed.

Accordingly, the projector 1 according to the present embodiment can be prevented from transferring to a standby state while a process is being executed, by performing operation suppression on a module for receiving requests from outside, when transferring to a standby state.

As methods for the user to give requests to the projector 1, the user may input user operation by using keys provided on the main unit of the projector 1 or a remote controller (not shown in FIG. 2), or input user operation by operating the PC 2 via the network 3.

In the following description, a request may be received by either of the above methods; however, a request may be received even if only one of the above methods can be used.

Figure 1:
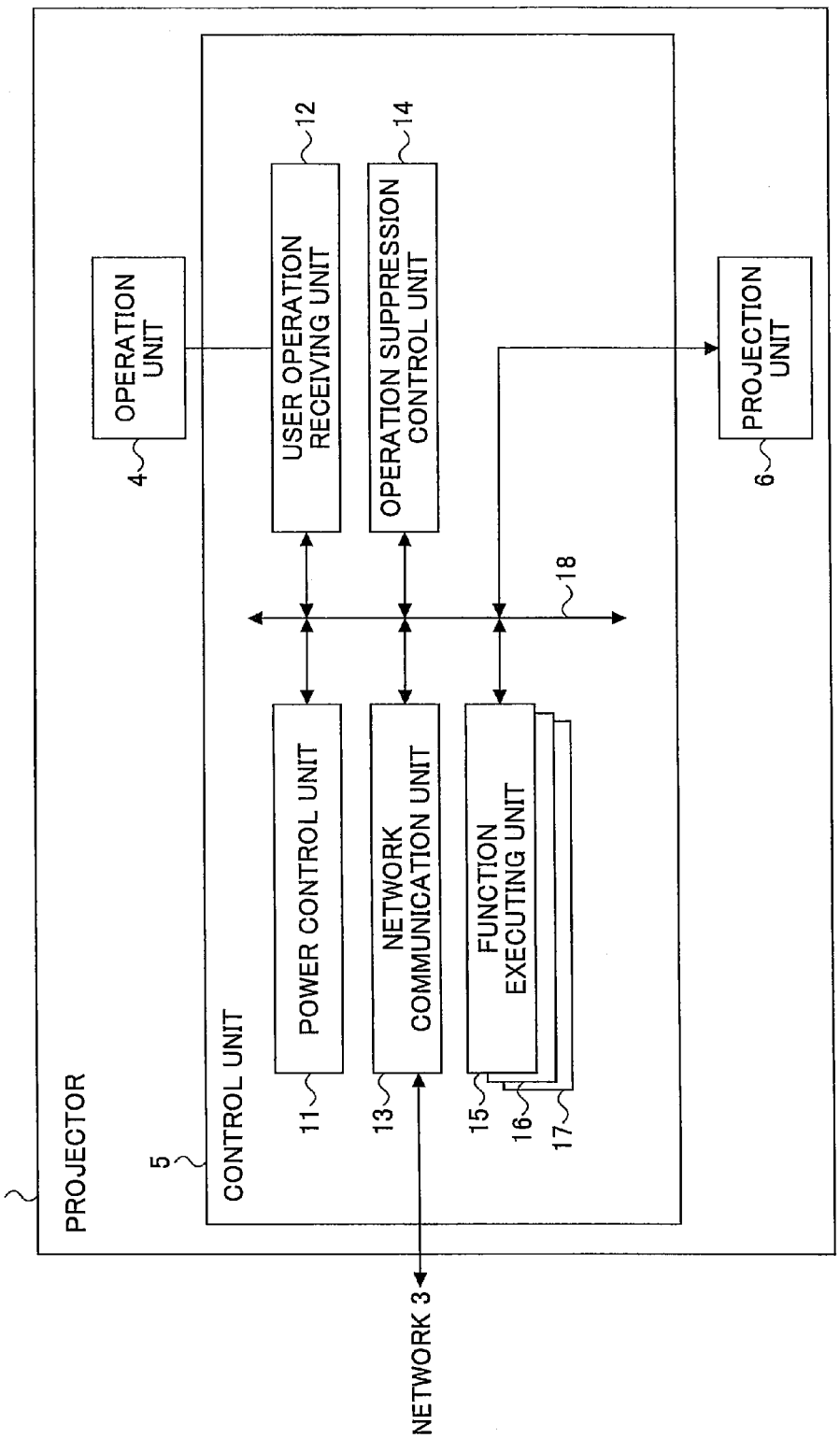
FIG. 1 is a block diagram illustrating the internal configuration of a projector according to an embodiment of the present invention.

Next, a description is given of the internal configuration of the projector 1, with reference to FIG. 1.

FIG. 1 is a block diagram illustrating the internal configuration of the projector 1 shown in FIG. 2.

The projector 1 includes an operation unit 4, a control unit 5, and a projection unit 6.

The operation unit 4 is used by the user for inputting various kinds of operation information to the projector 1, and the user may directly input a standby request to the projector 1.

The projection unit 6 projects images such as still images and video images on a projection surface such as a screen, based on image data (also referred to as "video data") sent from the PC 2.

The control unit 5 is realized by a microcomputer such as a ROM and a RAM, and includes various function units such as a power control unit 11, a user operation receiving unit 12, a network communication unit 13, an operation suppression control unit 14, and function executing units 15 through 17, which are connected to each other by a system bus 18.

In the present embodiment, there are three function executing units 15 through 17; however, the process described below may be performed with more than three function executing units.

The system bus 18 connects the power control unit 11, the user operation receiving unit 12, the network communication unit 13, the operation suppression control unit 14, and the function executing units 15 through 17. The system bus 18 is a path through which data communication can be performed between these units.

The power control unit 11 is a module for switching the power state by controlling the power supplied from a power source (not shown) of the projector 1. The power states include plural types of states such as a regular state and a standby state, which are described in detail below.

The power control unit 11 has a function of controlling the projector 1 to transfer to a power saving state and for controlling the projector 1 to return to a regular state from the power saving state.

The user operation receiving unit 12 is a module for receiving a request that is sent from the user by directly operating the projector 1. The process requested by the user and received by the user operation receiving unit 12 is performed by the function executing units 15 through 17.

The network communication unit 13 is a module for receiving a request sent from the PC 2 via the network 3. The process of the request received by the network communication unit 13 is also performed by the function executing units 15 through 17, similar to the case of the user operation receiving unit 12.

The user operation receiving unit 12 and the network communication unit 13 function as plural input units for inputting process requests.

When a request for operation suppression is received from the operation suppression control unit 14, the user operation receiving unit 12 and the network communication unit 13 have a function of ending all processes for which a request is received before receiving the request for operation suppression, and then sending a response of operation suppression to the operation suppression control unit 14. Furthermore, the user operation receiving unit 12 and the network communication unit 13 have a function of receiving a request for a process that is specified in advance, even during an operation suppression state after receiving the above request for predetermined operation suppression from the operation suppression control unit 14.

Furthermore, the user operation receiving unit 12 and the network communication unit 13 have a function of receiving a request for a process even during an operation suppression state after receiving the above request for predetermined operation suppression from the operation suppression control unit 14, accumulating the received request for a process, and responding to the accumulated request for a process when a request to release the operation suppression is received from the operation suppression control unit 14. The user operation receiving unit 12 and the network communication unit 13 have a function of not accumulating the same process requests in duplicate, with regard to requests for processes received during the operation suppression state.

The operation suppression control unit 14 is a module for requesting operation suppression to a module on which operation suppression needs to be performed in response to a request for operation suppression from the power control unit 11. When a response, indicating that operation suppression is completed, is received from all modules for which operation suppression has been requested, the operation suppression control unit 14 sends a response to the power control unit 11 indicating that the power state can now be changed as operation suppression has been completed.

Before the operation suppression control unit 14 controls the power control unit 11 to cause the projector 1 to transfer to the power saving state, the operation suppression control unit 14 has a function of sending a request for predetermined operation suppression to the user operation receiving unit 12, the network communication unit 13, and the function executing units 15 through 17. When the operation suppression control unit 14 controls the power control unit 11 to cause the projector 1 to return from the power saving state to a regular state, the operation suppression control unit 14 has a function of implementing control to request release of operation suppression to the user operation receiving unit 12, the network communication unit 13, and the function executing units 15 through 17.

Furthermore, the operation suppression control unit 14 has a function of requesting operation suppression to the user operation receiving unit 12, the network communication unit 13, and the function executing units 15 through 17, to end a process for which a request has been received before receiving the request for predetermined operation suppression. Furthermore, the operation suppression control unit 14 has a function of requesting operation suppression to the user operation receiving unit 12, the network communication unit 13, and the function executing units 15 through 17, to cancel a process for which a request is received after receiving the request for predetermined operation suppression. The operation suppression control unit 14 has a function of requesting predetermined operation suppression to the user operation receiving unit 12, the network communication unit 13, and the function executing units 15 through 17 an order that is stored in advance. The operation suppression control unit 14 has a function of requesting release of predetermined operation suppression to the user operation receiving unit 12, the network communication unit 13, and the function executing units 15 through 17 in an order that is stored in advance. The operation suppression control unit 14 has a function of requesting predetermined operation suppression to one or more of the user operation receiving unit 12, the network communication unit 13, and the function executing units 15 through 17 which are specified in advance.

The function executing units 15 through 17 are a group of modules for executing a process in response to a request input to the projector 1 via the network 3 or by user operation.

The function executing units 15 through 17 function as plural processing units for executing a process corresponding to a process request input with the input unit.

Next, a description is given of the respective power states of the projector 1 and contents of requests received in the respective power states at the projector 1, with reference to FIG. 3.

FIG. 3 illustrates an example of a table indicating the respective power states of the projector 1 shown in FIG. 1 and contents of requests received in the respective power states at the projector 1.

For example, the table of FIG. 3 is stored by the operation suppression control unit 14 shown in FIG. 1, and indicates the correspondence relationship between the power states of the projector 1 and the requests received in the respective power states.

The power state "ON" means that power is supplied to all units inside the projector 1 and the projector 1 is regularly operating. Power is supplied to all units of the projector 1, and all requests input to the projector 1 can be received.

The power state "standby" means that power supply to part of the units inside the projector 1 is stopped. The standby state is a power saving state in which power supply to the function executing units 15 through 17 and the projection unit 6 is shut off. Meanwhile, power is supplied to the power control unit 11. Power is not supplied to the function executing units 15 through 17. Therefore, requests other than a request to turn on the power cannot be received. In order to receive a request to turn on the power, power is supplied to either one or both of the user operation receiving unit 12 and the network communication unit 13.

The power state "OFF" means that the main power supply of the projector 1 is turned off (the projector 1 is not plugged in). In this power state, power is not supplied anywhere in the projector 1, and therefore no requests can be received.

With regard to the projector 1 according to the present embodiment, a description is given of a method of performing operation suppression when the power state transfers from "ON" to "standby", and a method of releasing operation suppression when the power state transfers from "standby" to "ON".

Other than the above three power states, there is also a power state refereed to as "active standby".

In the power state of "active standby", power is supplied to more units compared to the "standby" state, and therefore processes can be performed for some more requests other than a request for turning on the power.

Next, a description is given of a process when operation suppression is performed by the projector 1.

Figure 4:
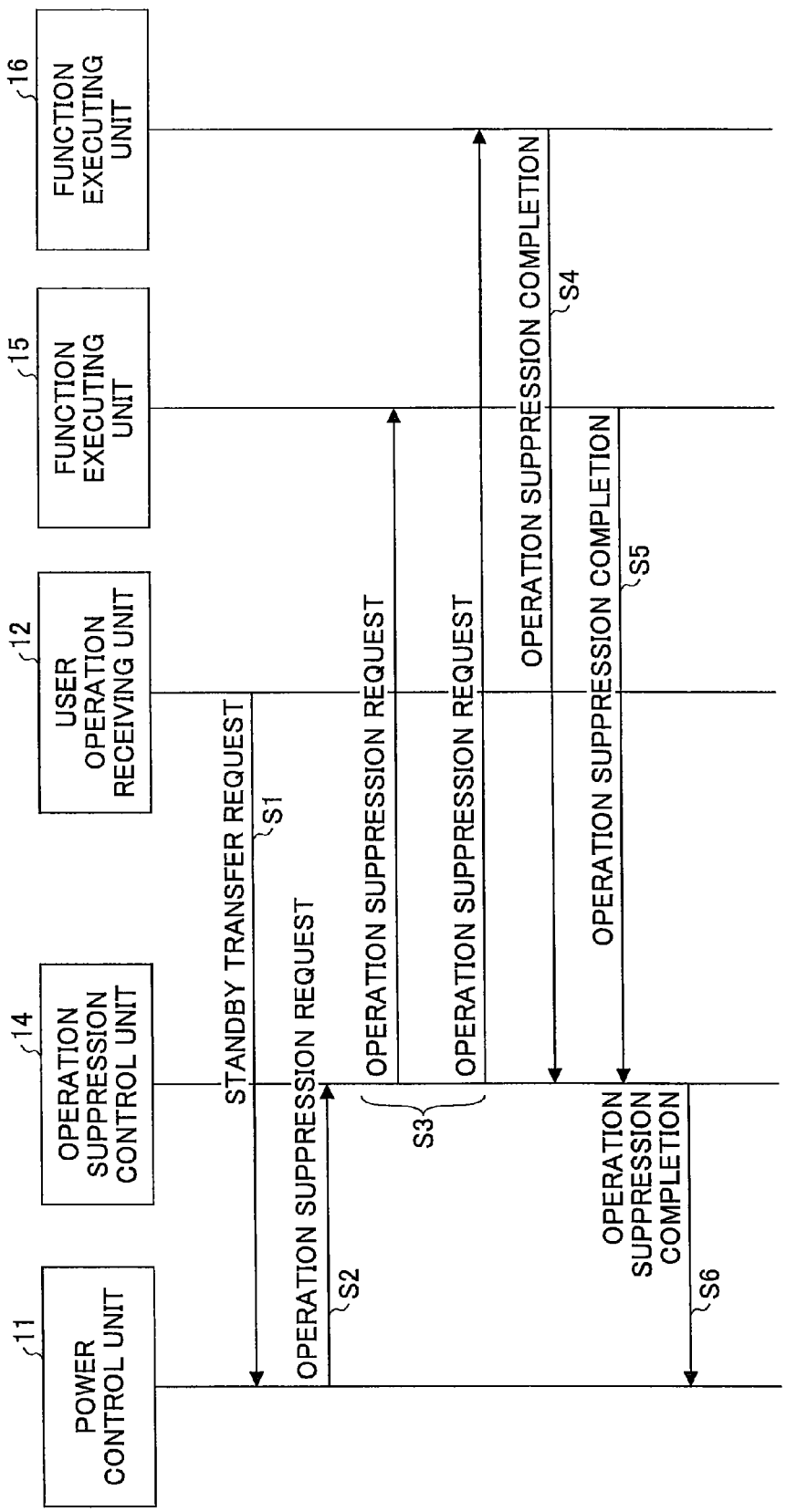
FIG. 4 is a sequence diagram illustrating a process performed by the projector shown in FIG. 1 when applying operation suppression.

FIG. 4 is a sequence diagram illustrating a process performed by the projector 1 shown in FIG. 1 when applying operation suppression. In FIG. 4, the steps are indicated as "S".

A description is given of a process in which operation suppression is performed on the modules of the function executing units 15 and 16 shown in FIG. 1.

When a request to transfer to standby is received from the user, the user operation receiving unit 12 shown in FIG. 1 sends a standby transfer request to the power control unit 11 (step S1 in FIG. 4).

Furthermore, although not shown in FIG. 4, when a standby transfer request is sent form the PC 2 shown in FIG. 2 to the projector 1 via the network 3, the network communication unit 13 sends a standby transfer request to the power control unit 11.

Next, the power control unit 11 sends an operation suppression request for transferring to standby to the operation suppression control unit 14 (step S2).

The operation suppression control unit 14 sends an operation suppression request to modules that need to be subjected to operation suppression. Here, operation suppression requests are sent to the function executing units 15 and 16 (step S3). Operations of the function executing units 15 and 16 that have received the operation suppression requests are described below.

Meanwhile, when the modules of the function executing units 15 and 16, which have received the operation suppression requests, complete operation suppression for themselves, the function executing units 15 and 16 report operation suppression completion indicating that operation suppression has been completed to the operation suppression control unit 14 (steps S4 and S5).

Then, when responses indicating operation suppression completion are received from the function executing units 15 and 16, the operation suppression control unit 14 sends a response indicating operation suppression completion to the power control unit 11 (step S6). The power control unit 11 that has received this response executes a process for transferring the power state to standby.

Next, a description is given of a process performed when the operation suppression control unit 14 shown in FIG. 1 performs operation suppression.

Figure 5:
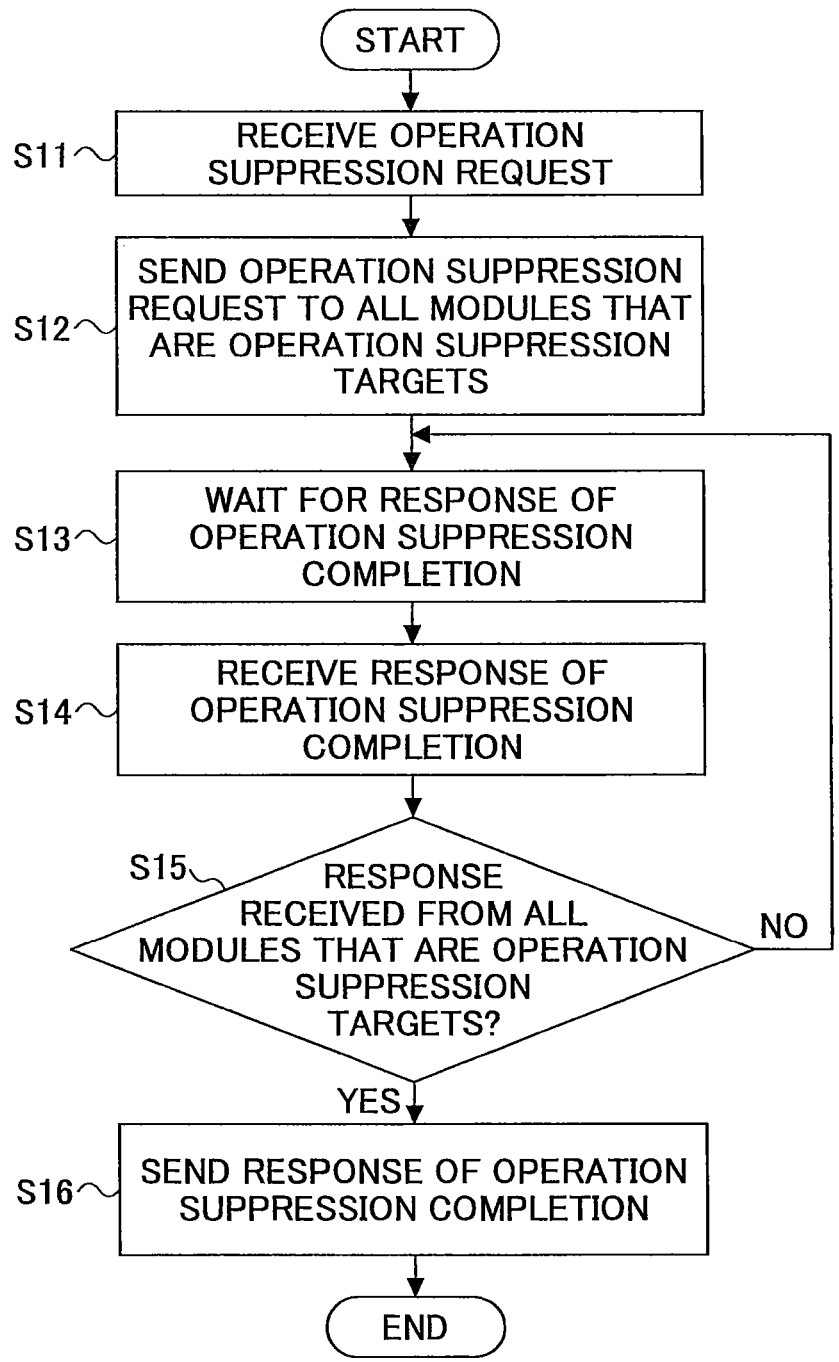
FIG. 5 is a flowchart illustrating an operation suppression process performed by the operation suppression control unit shown in FIG. 1.

FIG. 5 is a flowchart illustrating an operation suppression process performed by the operation suppression control unit 14 shown in FIG. 1. This process is executed in a power on state of the projector 1. In FIG. 5, the steps are indicated as "s".

When an operation suppression request is received from the power control unit 11 in step S11, the process proceeds to step S12.

In step S12, an operation suppression request is sent to all modules that are operation suppression targets, and the process proceeds to step S13. In this case, all modules correspond to the function executing units 15 and 16.

In step S13, the operation suppression control unit 14 waits for responses indicating operation suppression completion from all of the modules to which the operation suppression request has been sent, and the process proceeds to step S14.

In step S14, when responses indicating operation suppression completion are received from all of the modules to which the operation suppression request has been sent, and the process proceeds to step S15.

In step S15, the operation suppression control unit 14 determines whether responses have been received from all modules that are operation suppression targets. When responses are not received from all modules (NO in step S15), the process returns to step S13 to wait for responses indicating operation suppression completion. When responses are received from all modules (YES instep S15), the process proceeds to step S16.

In step S16, the operation suppression control unit 14 sends a response indicating operation suppression completion to the power control unit 11, and the process ends.

Figure 6:
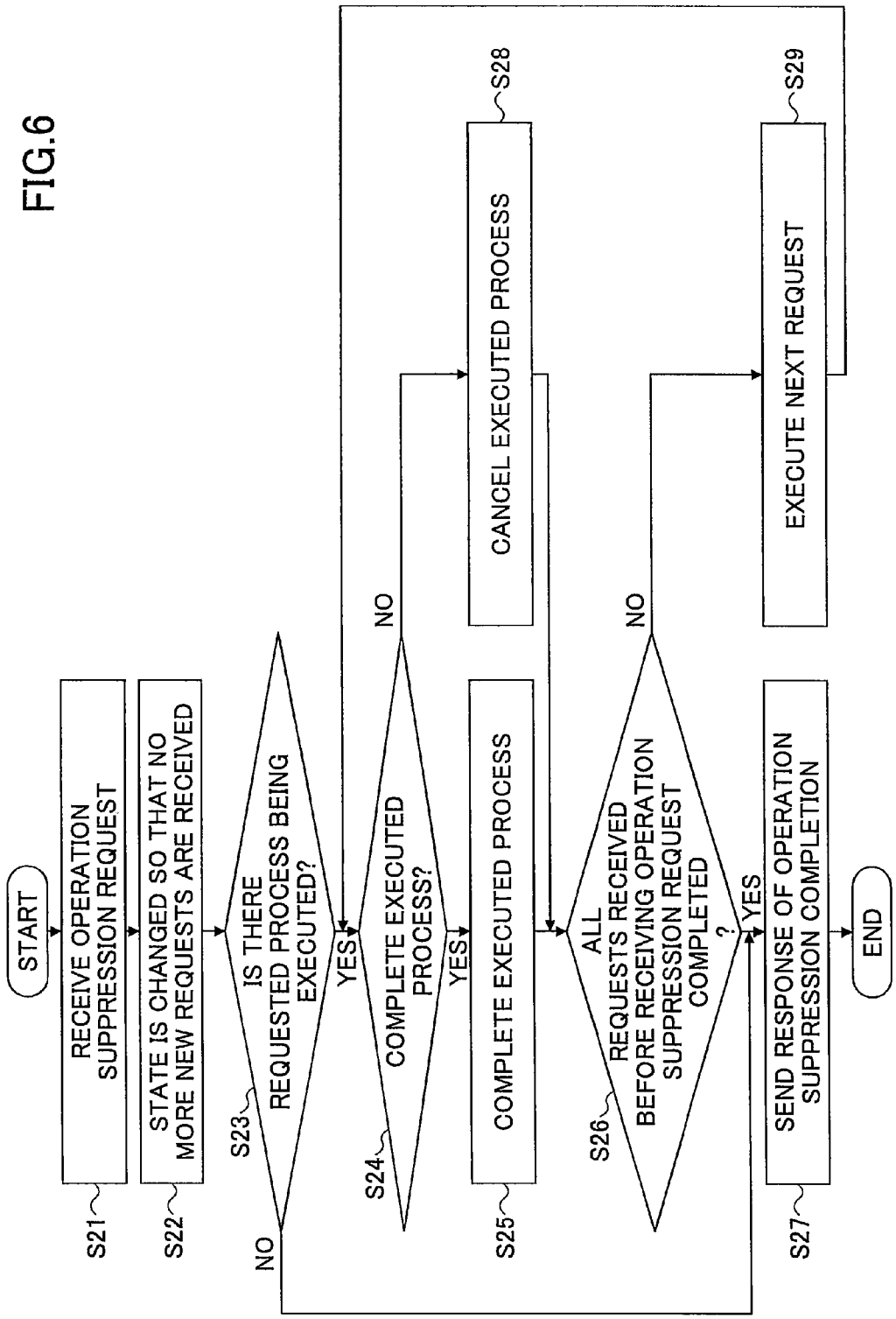
FIG. 6 is a flowchart illustrating an operation process of modules that have received an operation suppression request from the operation suppression control unit shown in FIG. 1.

Next, a description is given of an operation process of modules that have received an operation suppression request from the operation suppression control unit 14 shown in FIG. 1, with reference to FIG. 6.

A description is given of a process in which the modules that have received an operation suppression request are the function executing units 15 and 16.

FIG. 6 is a flowchart illustrating an operation process of modules that have received an operation suppression request from the operation suppression control unit 14 shown in FIG. 1. In FIG. 6, the steps are indicated as "S".

The function executing units 15 and 16 respectively execute the process of steps S21 through S29.

In step S21, when an operation suppression request is received form the operation suppression control unit 14, the process proceeds to step S22.

In step S22, the state is changed so that no more new requests are received, and the process proceeds to step S23.

In step S23, the module determines whether there is a requested process that is being executed, and when there is an executed process (YES in step S23), the process proceeds to step S24, and when there is no executed process (NO in step S23), the process proceeds to step S27.

In step S24, the module determines whether to complete the executed process. When the module determines to complete the process (YES in step S24), the process proceeds to step S25, and when the module determines not to complete the process (NO in step S24), the process proceeds to step S28.

In step S25, the executed process is completed, and the process proceeds to step S26.

Meanwhile, in step S28, the executed process is canceled, and the process proceeds to step S26.

The process of step S24 is to determine whether the executed process takes a long time. When the process does not take a long time, the process is completed in step S25. When the process takes a long time, the process is cancelled by cancelling the request in step S28.

In step S26, the model determines whether all requests received before receiving the operation suppression request have been completed, and when the requests are completed (YES in step S26), the process proceeds to step S27, and when the requests are not completed (NO in step S26), the process proceeds to step S29.

In step S27, the module sends a response indicating operation suppression completion to the operation suppression control unit 14, and the process ends.

In step S29, the next request is executed, and the process returns to step S24.

In step S26, the module determines whether all requests, which have been received before receiving the operation suppression request was received, have been executed, and when there are requests that have not been processed, the module executes the process of the request received after the completed/cancelled request (step S29). When there are no unprocessed requests, the process proceeds to step S27.

Next, a description is given of a process performed when the projector 1 releases operation suppression.

Figure 7:
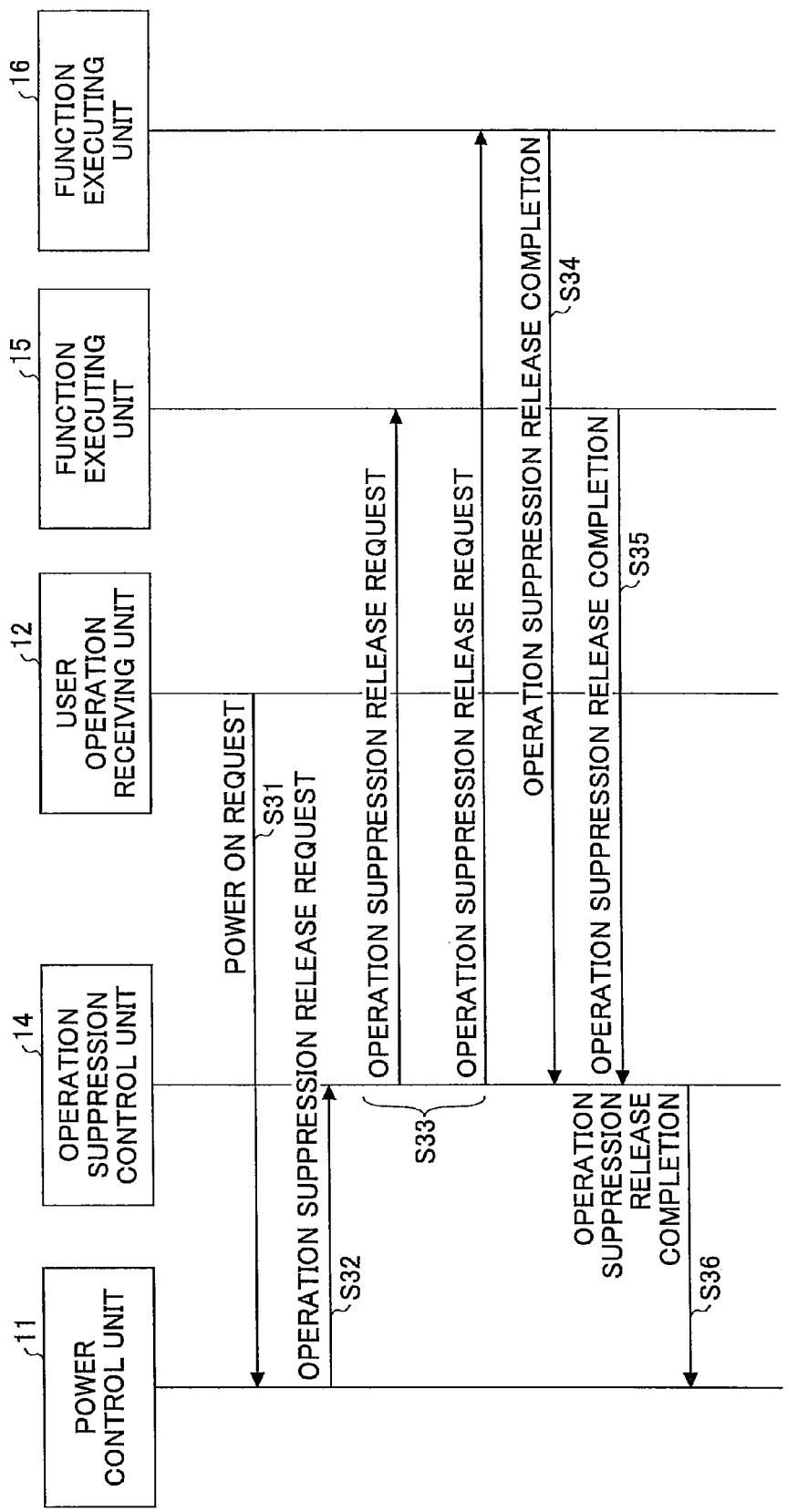
FIG. 7 is a sequence diagram illustrating a process by the projector shown in FIG. 1 when operation suppression is released.

FIG. 7 is a sequence diagram illustrating a process by the projector 1 shown in FIG. 1 when operation suppression is released. In FIG. 7, the steps are indicated as "S".

A description is given of a process of releasing operation suppression when the function executing units 15 and 16 are in the operation suppression state.

When a request to turn on the power is received from the user, the user operation receiving unit 12 sends a power on request to the power control unit 11 (step S31).

Furthermore, although not shown in FIG. 7, when the PC 2 shown in FIG. 2 sends a power on request to the projector 1 via the network 3, the network communication unit 13 sends a power on request to the power control unit 11.

Next, when the process for transferring to the ON power state is completed, the power control unit 11 sends an operation suppression release request to the operation suppression control unit 14 (step S32).

The operation suppression control unit 14 sends an operation suppression release request to all modules that are subjected to operation suppression (step S33). Here, the operation suppression release request is sent to the function executing units 15 and 16.

Meanwhile, the function executing units 15 and 16 that have received the operation suppression release request from the operation suppression control unit 14 respectively transfer the states of their own modules to complete releasing operation suppression, and reports operation suppression release completion to the operation suppression control unit 14 (steps S34 and S35). The states of the modules of the function executing units 15 and 16 are described below.

When a response indicating operation suppression release completion is received from the function executing units 15 and 16, the operation suppression control unit 14 sends a response indicating operation suppression release completion to the power control unit 11 (step S36).

Figure 8:
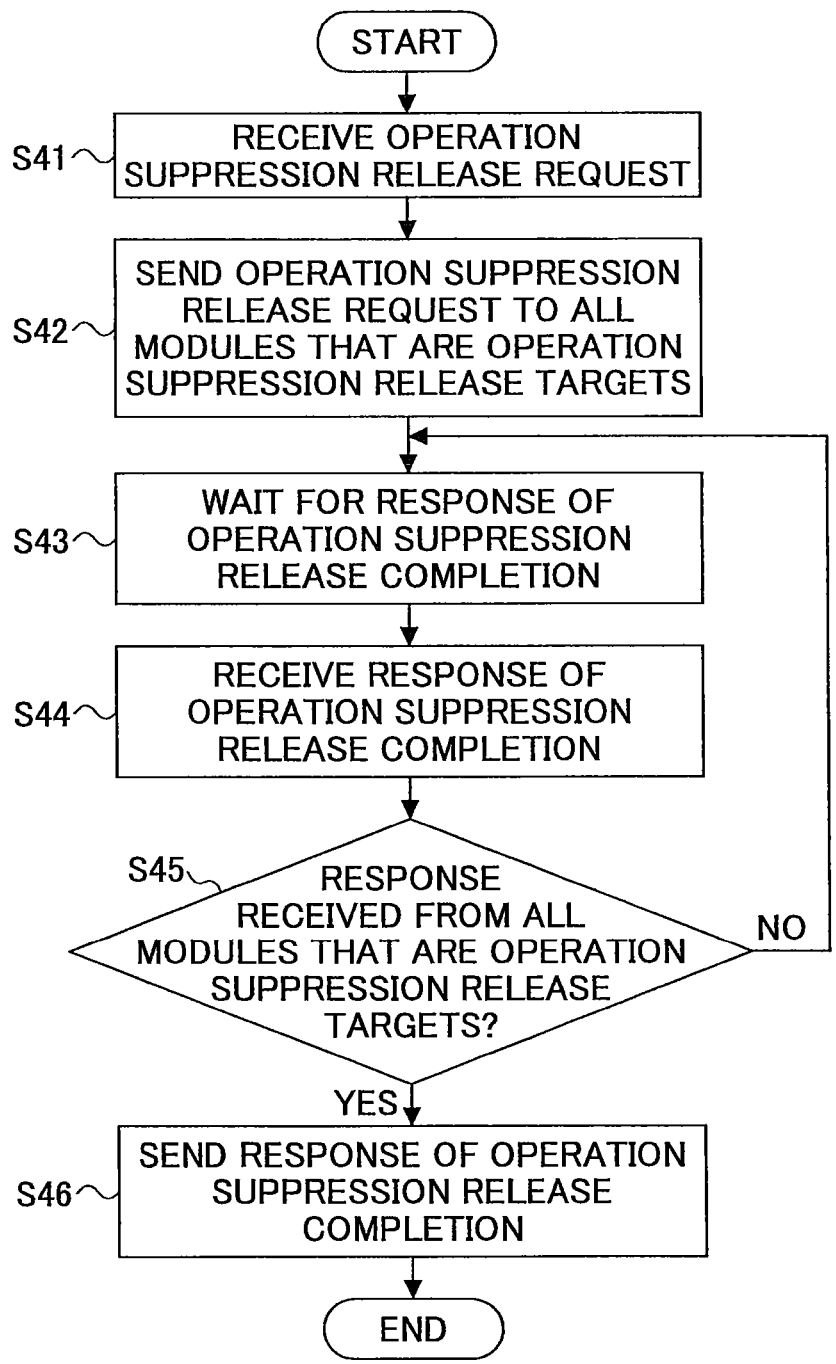
FIG. 8 is a flowchart illustrating a process when releasing operation suppression performed by the operation suppression control unit shown in FIG. 1.

Next, a description is given of a process when releasing operation suppression performed by the operation suppression control unit 14 shown in FIG. 1, with reference to FIG. 8.

FIG. 8 is a flowchart illustrating a process when releasing operation suppression performed by the operation suppression control unit 14 shown in FIG. 1. This process is for releasing the operation suppression of the function executing units 15 and 16 that are being subjected to operation suppression. This process is executed when the projector 1 is in a power on state. In FIG. 8, the steps are indicated as "S".

In step S41, when an operation suppression release request is received from the power control unit 11, the process proceeds to step S42.

In step S42, an operation suppression release request is sent to all modules that are operation suppression release targets, and the process proceeds to step S43. In this case, all modules correspond to the function executing units 15 and 16.

In step S43, the operation suppression control unit 14 waits for responses indicating operation suppression release completion from all of the modules to which the operation suppression release request has been sent, and the process proceeds to step S44.

In step S44, when responses indicating operation suppression release completion are received from all of the modules to which the operation suppression release request has been sent, the process proceeds to step S45.

In step S45, the operation suppression control unit 14 determines whether responses have been received from all modules that are operation suppression release targets. When responses are received from all modules (YES in step S45), the process proceeds to step S46. When responses are not received from all modules (NO in step S45), the process returns to step S43.

In step S46, the operation suppression control unit 14 sends a response indicating operation suppression release completion to the power control unit 11, and the process ends.

Figure 9:
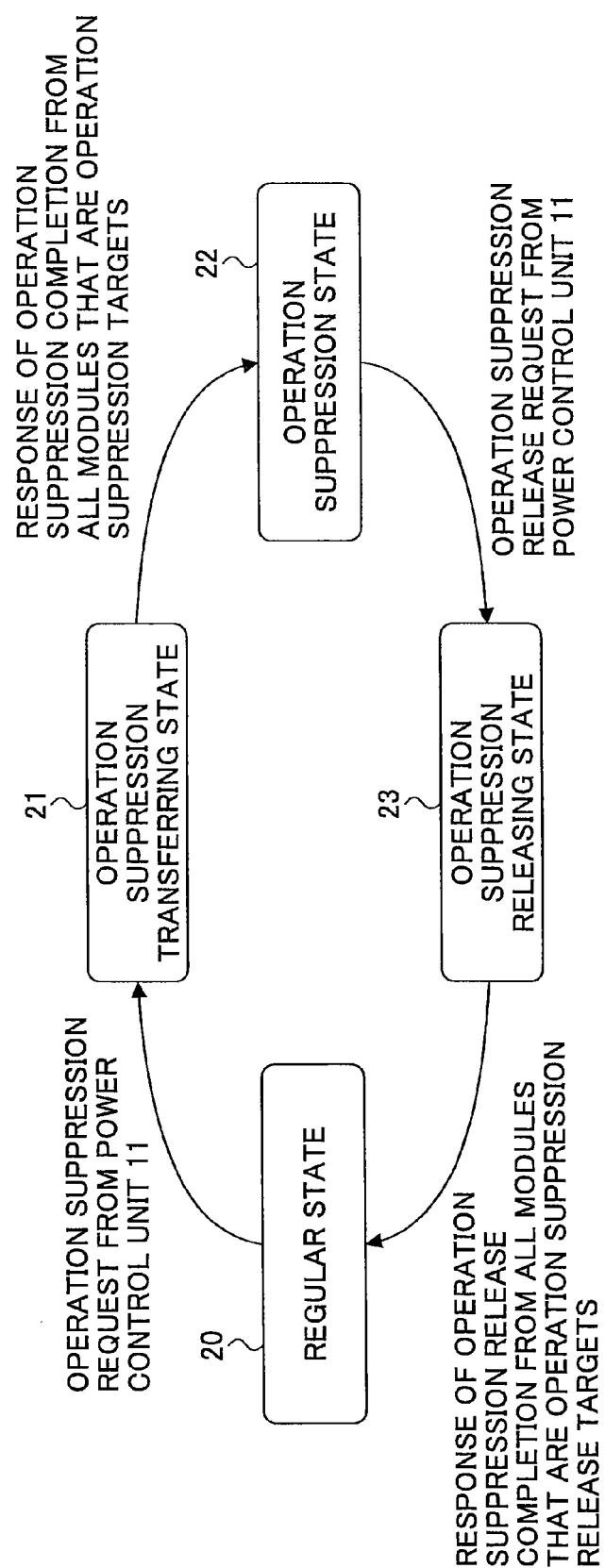
FIG. 9 is a transition diagram illustrating states of the projector shown in FIG. 1.

Next, a description is given of states of the projector 1 with reference to FIG. 9.

FIG. 9 is a transition diagram illustrating states of the projector 1 shown in FIG. 1.

The operation suppression control unit 14 holds information indicating that the projector 1 has transferred to the respective states of 20 through 23 shown in FIG. 9.

The operation suppression control unit 14 causes the projector 1 to be in the regular state denoted by 20 when the power is turned on. When an operation suppression request is received from the power control unit 11, the operation suppression control unit 14 causes the projector 1 to transfer to an operation suppression transferring state denoted by 21.

Then, when a response indicating operation suppression completion is received from all modules that are operation suppression targets (for example, the function executing units 15 and 16), the operation suppression control unit 14 causes the projector 1 to transfer to an operation suppression state denoted by 22.

Next, when an operation suppression release request is received from the power control unit 11 while the projector 1 is being subjected to operation suppression, the operation suppression control unit 14 causes the projector 1 to transfer to an operation suppression releasing state denoted by 23.

Then, when a response indicating operation suppression release completion is received from all modules that are operation suppression release targets (for example, the function executing units 15 and 16), the operation suppression control unit 14 causes the projector 1 to transfer to a regular state denoted by 20.

Figure 10:
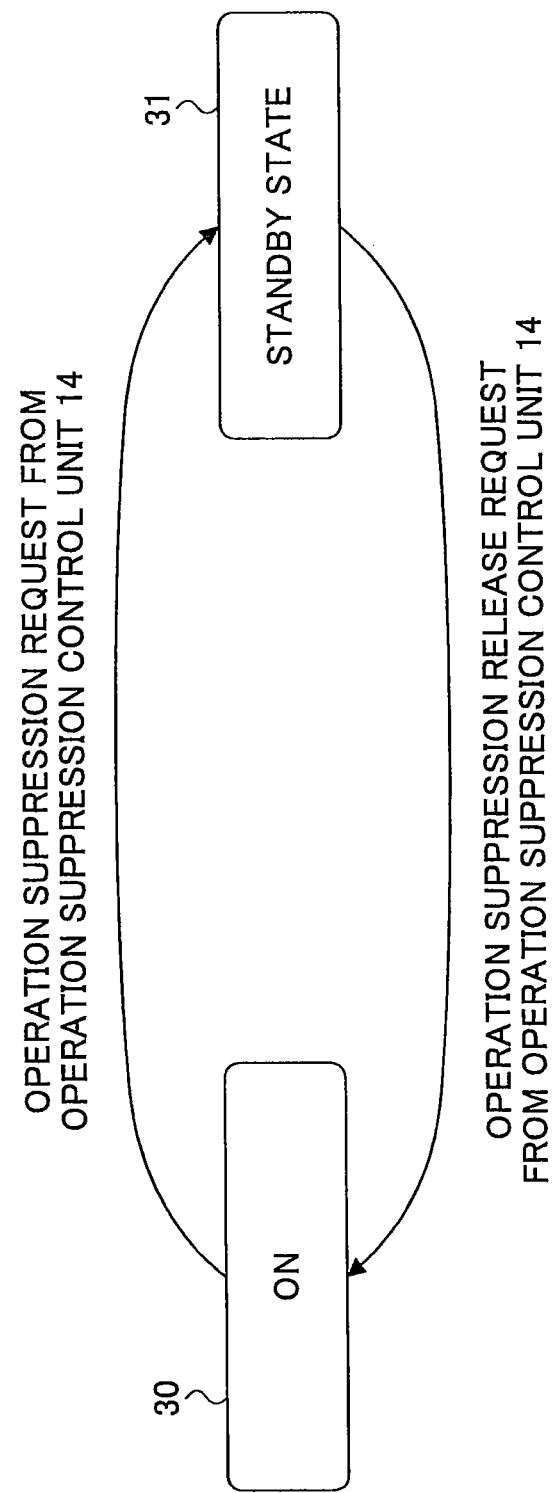
FIG. 10 is a transition diagram illustrating states of modules of the projector shown in FIG. 1 that are operation suppression targets.

Next, a description is given of states of modules of the projector 1 that are operation suppression targets, with reference to FIG. 10.

FIG. 10 is a transition diagram illustrating states of modules of the projector 1 shown in FIG. 1 that are operation suppression targets.

In this example, the modules of that are operation suppression targets are the function executing units 15 and 16.

The function executing units 15 and 16 hold information indicating that the modules themselves have transferred to the respective states of 30 and 31 shown in FIG. 10.

When the module is operating regularly in a state where the power is on, the module maintains the on state denoted by 30. When an operation suppression request for transferring to a standby state is received from the operation suppression control unit 14, the module transfers to a standby state denoted by 31. Furthermore, when an operation suppression release request is received from the operation suppression control unit 14 while the module is in the in the standby state, the module returns to the on state denoted by 30.

Next, a description is given of a process performed when the modules that are operation suppression targets receive a process request.

Figure 11:
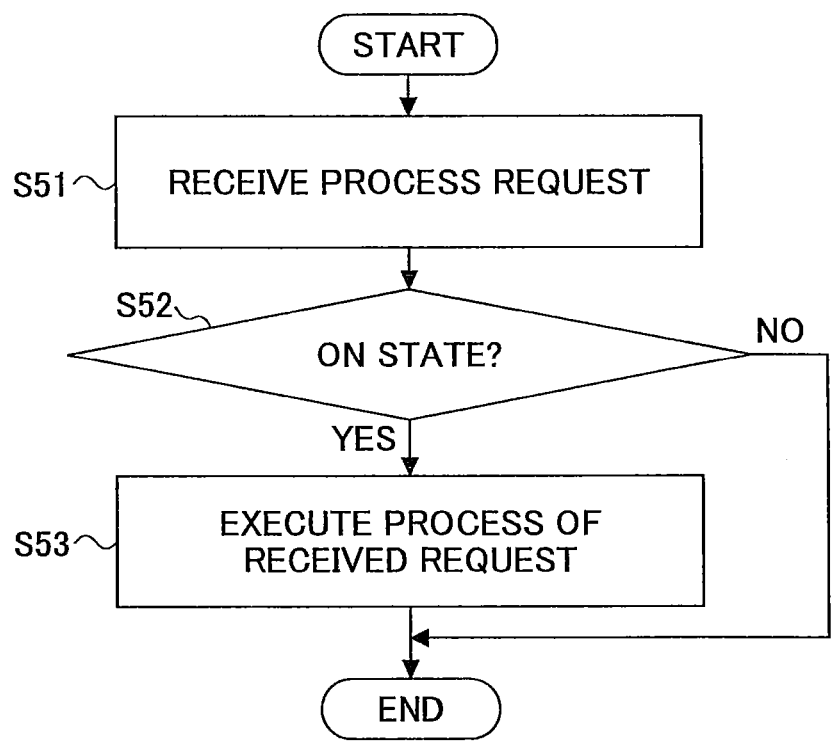
FIG. 11 is a flowchart illustrating a process performed when the modules of the projector that are operation suppression targets receive a request.

FIG. 11 is a flowchart illustrating a process performed when the modules of the projector 1 that are operation suppression targets receive a request. In this process, the modules that are operation suppression targets are the function executing units 15 and 16. In FIG. 11, the steps are indicated as "S".

When each of the function executing units 15 and 16 (modules) receives a process request in step S51, in step S52, the module determines whether it is in an on state. When the module is in an on state (YES in step S51), the process proceeds to step S53. When the module is not in an on state (NO in step S51), the process ends.

In step S53, the module executes a process for which the request has been received, and the executed process ends.

In the process of step S52, when the module itself is in an on state, i.e., in a regular state, the module executes the requested process (step S53). When the module is not in an on state, i.e., in an operation suppression state, then nothing is performed and the process ends.

Next, with reference to FIG. 12, a description is given of a table held by the operation suppression control unit 14 shown in FIG. 1, indicating whether a module is an operation suppression target.

Here, a description is given whether the function executing units 15 through 17 are operation suppression targets.

FIG. 12 illustrates an example of a table held by the operation suppression control unit 14 shown in FIG. 1, indicating whether a module is an operation suppression target.

The operation suppression control unit 14 stores the table shown in FIG. 12 in advance, and can thus identify whether the respective modules of the function executing units 15 through 17, are operation suppression targets by referring to the stored table.

The table shown in FIG. 12 records information expressing "YES" indicating that the function executing units 15 and 16 are operation suppression targets and information expressing "NO" indicating that the function executing unit 17 is not an operation suppression target.

Accordingly, the operation suppression control unit 14 can send an operation suppression request to all modules that are operation suppression targets.

Next, with reference to FIG. 13, a description is given of a table held by the modules that are operation suppression targets shown in FIG. 1, indicating process contents to be executed when an operation suppression request is received.

FIG. 13 illustrates an example of a table held by the modules of the projector 1 shown in FIG. 1 that are operation suppression targets, indicating process contents to be executed when an operation suppression request is received.

In this example, a description is given of a table held by the function executing unit 15.

The function executing unit 15 stores the table shown in FIG. 13 in advance, and therefore when the module itself receives an operation suppression request, the function executing unit 15 refers to the table of FIG. 13, and if function A, function C or function D is being executed, the function executing unit 15 completes the executed function and implements operation suppression so that subsequent requests are not executed until operation suppression is released.

Furthermore, when the module itself receives an operation suppression request, the function executing unit 15 refers to the table of FIG. 13, and when function B is being executed, the function executing unit 15 cancels the executed function B and implements operation suppression so that subsequent requests are not executed until operation suppression is released.

Next, with reference to FIG. 14, a description is given of a table held by the operation suppression control unit 14 shown in FIG. 1, indicating whether modules are operation suppression targets, the order of implementing operation suppression, and the order of releasing operation suppression.

In this example, a description is given on whether the user operation receiving unit 12, the network communication unit 13, and the function executing units 15 and 16 are operation suppression targets, and the order of implementing operation suppression and the order of releasing operation suppression with regard to these modules.

FIG. 14 illustrates a table held by the operation suppression control unit 14 shown in FIG. 1, indicating whether modules are operation suppression targets, the order of implementing operation suppression, and the order of releasing operation suppression.

There may be cases where the modules to be subjected to operation suppression are dependent on each other, and unless a certain module is subjected to operation suppression, it may not be possible to perform operation suppression on another module.

In such a case, in the table held by the operation suppression control unit 14 indicating whether modules are operation suppression targets, information indicating "the order of operation suppression" is added.

The operation suppression control unit 14 simultaneously sends operation suppression requests to modules having the same value of "the order of operation suppression". When a response indicating operation suppression completion is returned from all modules to which the operation suppression requests have been sent, the operation suppression control unit 14 sends an operation suppression request to the module of the next order.

For example, according to the order of operation suppression indicated in the table of FIG. 14, the operation suppression control unit 14 first simultaneously sends operation suppression requests to the user operation receiving unit 12 and the network communication unit 13, and when responses indicating operation suppression completion are returned from the user operation receiving unit 12 and the network communication unit 13, the operation suppression control unit 14 requests operation suppression to the function executing unit 15 of the next order.

Furthermore, when it is necessary to follow an order when releasing operation suppression, information of "the order of releasing operation suppression" is also added to the table held by the operation suppression control unit 14.

The operation suppression control unit 14 simultaneously sends operation suppression release requests to modules having the same value of "the order of releasing operation suppression". When a response indicating operation suppression release completion is returned from all modules to which the operation suppression release requests have been sent, the operation suppression control unit 14 sends an operation suppression release request to the module of the next order.

For example, according to the order of operation suppression release indicated in the table of FIG. 14, the operation suppression control unit 14 first sends an operation suppression release request to the function executing unit 15, and when a response indicating operation suppression release completion is returned from the function executing unit 15, an operation suppression release request is sent to the network communication unit 13 of the next order, and when a response indicating operation suppression release completion is returned from the network communication unit 13, an operation suppression release request is sent to the user operation receiving unit 12 of the next order.

Figure 15:
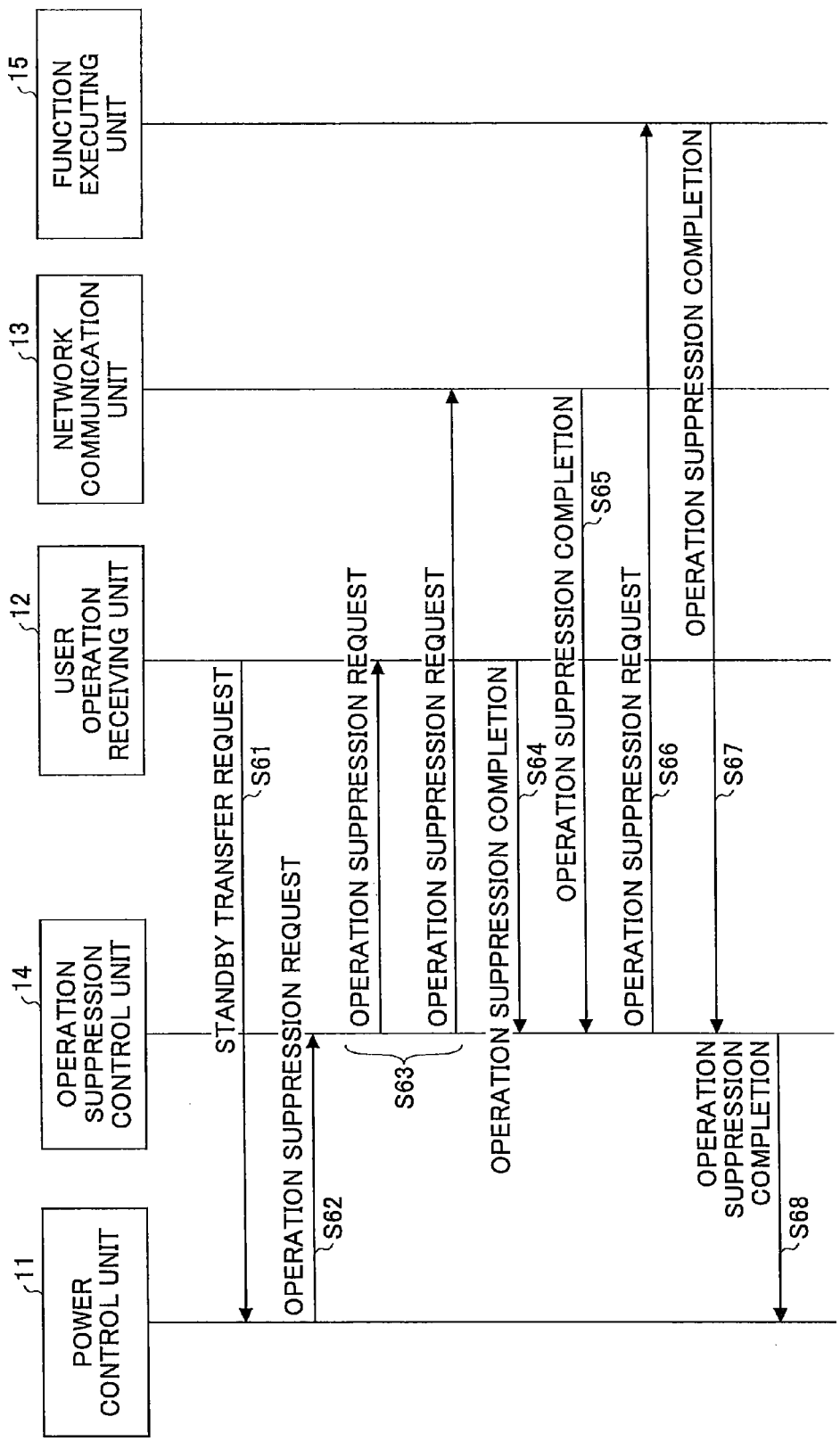
FIG. 15 is a sequence diagram illustrating a process performed by the projector shown in FIG. 1 when applying operation suppression based on the table of FIG. 14.

Next, with reference to FIG. 15, a description is given of a process performed by the projector 1 when applying operation suppression based on the table of FIG. 14.

FIG. 15 is a sequence diagram illustrating a process performed by the projector 1 shown in FIG. 1 when applying operation suppression based on the table of FIG. 14. In FIG. 15, the steps are indicated as "S".

This process is executed when the projector 1 is in a power on state.

When a request to transfer to a standby state is received from the user, the user operation receiving unit 12 shown in FIG. 1 sends a standby transfer request to the power control unit 11 (step S61 in FIG. 15).

Furthermore, although not shown in FIG. 15, when the PC 2 shown in FIG. 2 sends a standby transfer request to the projector 1 via the network 3, the network communication unit 13 sends a standby transfer request to the power control unit 11.

Next, the power control unit 11 sends an operation suppression request for transferring to the standby state to the operation suppression control unit 14 (step S62).

The operation suppression control unit 14 refers to the table of FIG. 14, and sends an operation suppression request to the modules that need to be subjected to operation suppression. In this example, an operation suppression request is sent to the user operation receiving unit 12, the network communication unit 13, and the function executing unit 15. However, based on the order of operation suppression, first, an operation suppression request is simultaneously sent to the user operation receiving unit 12 and the network communication unit 13 (step S63).

Meanwhile, when the modules of the user operation receiving unit 12 and the network communication unit 13, which have received the operation suppression requests, complete operation suppression for themselves, the modules of the user operation receiving unit 12 and the network communication unit 13 report operation suppression completion indicating that operation suppression has been completed to the operation suppression control unit 14 (steps S64 and S65).

Then, when responses indicating operation suppression completion are received from the user operation receiving unit 12 and the network communication unit 13, the operation suppression control unit 14 sends an operation suppression request to the function executing unit 15 of the next order of operation suppression (step S66). When the module of the function executing unit 15 that has received the operation suppression request completes operation suppression for itself, the function executing unit 15 reports operation suppression completion indicating that operation suppression has been completed to the operation suppression control unit 14 (step S67).

When a response indicating operation suppression completion is received from the function executing unit 15, the operation suppression control unit 14 sends a response indicating operation suppression completion to the power control unit 11 (step S68).

Then, the power control unit 11 that has received the response executes a process for transferring the power state to a standby state.

As described above, when it is necessary to follow an order of applying operation suppression to the respective modules, it is possible to follow the order.

Next, the power states of the projector 1 includes two standby states, i.e., an "active standby" state and a "regular standby" state.

Thus, information pertinent to "active standby" and information pertinent to "regular standby" may be held separately in the table held by the operation suppression control unit 14 shown in FIG. 1 indicating whether modules are operation suppression targets. Accordingly, the operation suppression control unit 14 can send an operation suppression request to all modules that are operation suppression targets.

Next, with reference to FIG. 16, a description is given of a table held by the operation suppression control unit 14 shown in FIG. 1 indicating whether modules are operation suppression targets, in which information pertinent to "active standby" and information pertinent to "regular standby" are held separately. In this example, a description is given on whether the function executing units 15 through 17 are operation suppression targets.

FIG. 16 illustrates an example of a table held by the operation suppression control unit 14 shown in FIG. 1 indicating whether modules are operation suppression targets, in which information pertinent to "active standby" and information pertinent to "regular standby" are held separately. In FIG. 16, regular standby is expressed as "standby".

The operation suppression control unit 14 stores the table shown in FIG. 16 in advance, and can thus identify whether the respective modules of the function executing units 15 through 17, are operation suppression targets for active standby and regular standby by referring to the stored table.

In the table of FIG. 16, in the active standby field, information expressing "YES" indicating that the function executing unit 15 is an operation suppression target is recorded and information expressing "NO" indicating that the function executing units 16 and 17 are not operation suppression targets is recorded.

Furthermore, in the table of FIG. 16, in the regular standby field, information expressing "YES" indicating that the function executing units 15 and 16 are operation suppression targets is recorded and information expressing "NO" indicating that the function executing unit 17 is not an operation suppression target is recorded.

Accordingly, the operation suppression control unit 14 can send an operation suppression request to all modules that are operation suppression targets, in the case of active standby and regular standby.

Furthermore, the operation suppression control unit 14 can change the module to which an operation suppression request is to be sent based on whether the power state is to be transferred to an active standby state or a regular standby state.

Next, with reference to FIG. 17, a description is given of an example of a table held by a module shown in FIG. 1 that is an operation suppression target, indicating whether functions can be executed in an active standby state and a regular standby state.

FIG. 17 illustrates an example of a table held by a module shown in FIG. 1 that is an operation suppression target, indicating whether functions can be executed in an active standby state and a regular standby state. In FIG. 17, regular standby is expressed as "standby".

In this example, a description is given of a table held by the function executing unit 15.

The function executing unit 15 stores the table shown in FIG. 17 in advance, and therefore the function executing unit 15 can refer to this table to determine that in an active standby state, function A and function B can be executed but function C and function D cannot be executed.

Furthermore, the function executing unit 15 can determine that in a regular standby state, the functions A through D cannot be executed.

Figure 18:
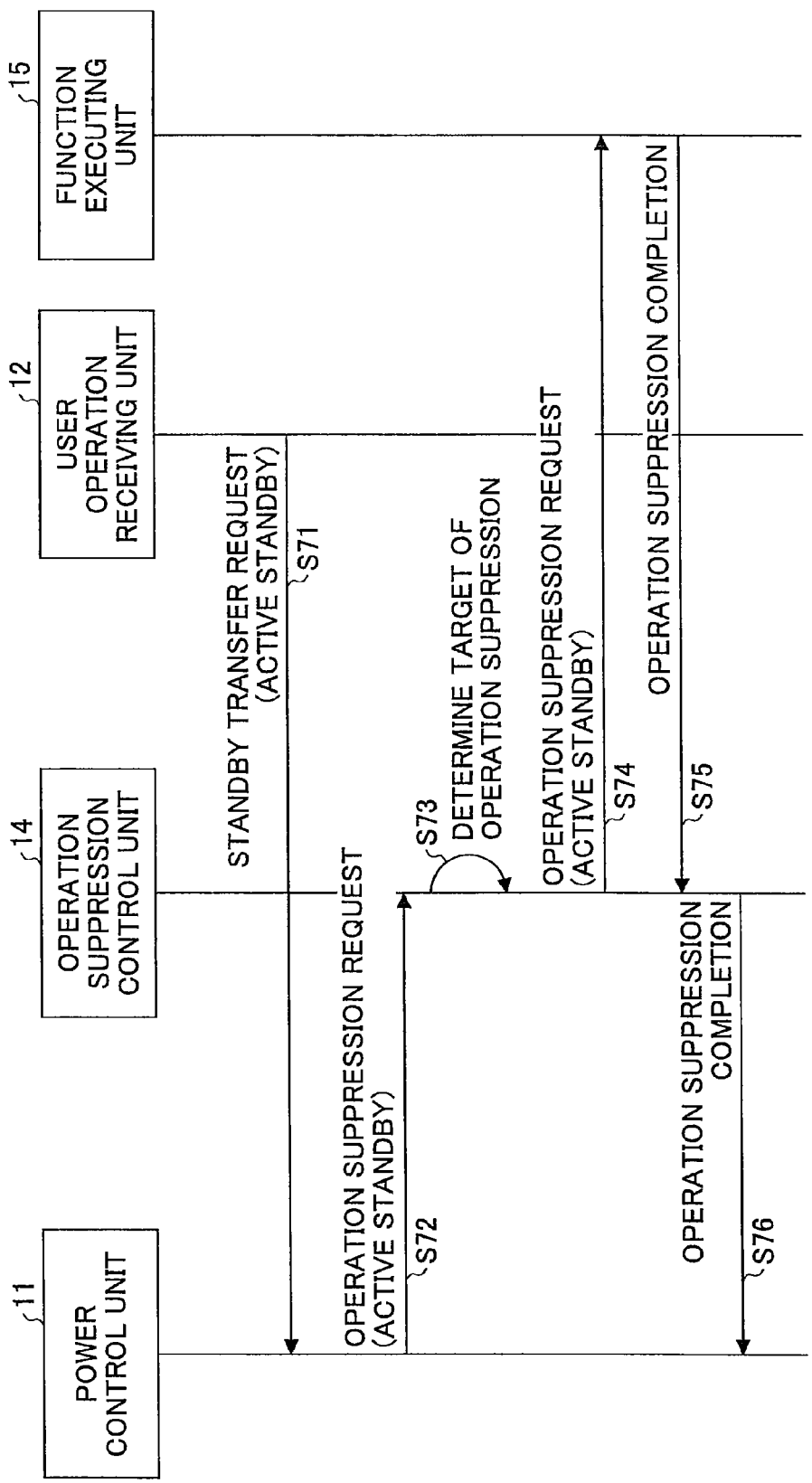
FIG. 18 is a sequence diagram illustrating a process when operation suppression is performed in an active standby state by the projector shown in FIG. 1.

Next, with reference to FIG. 18, a description is given of a process of applying operation suppression in an active standby state performed by the projector 1.

FIG. 18 is a sequence diagram illustrating a process when operation suppression is performed in an active standby state by the projector 1 shown in FIG. 1. In FIG. 18, the steps are indicated as "S".

This process is executed when the projector 1 is in a power on state.

A description is given of a process in which operation suppression is performed on the module of the function executing unit 15 shown in FIG. 1.

When a request to transfer to active standby is received from the user, the user operation receiving unit 12 shown in FIG. 1 sends a standby transfer request to the power control unit 11 (step S71 in FIG. 18).

Information indicating whether to transfer to the power state of active standby or the power state of regular standby is attached to the standby transfer request sent from the user operation receiving unit 12 to the power control unit 11. Therefore, the power state to which the module is to transfer is determined based on this information.

The power state to which the module is to transfer may be determined by having the power control unit 11 read a set value in the request sent from the user operation receiving unit 12 to the power control unit 11.

Furthermore, although not shown in FIG. 18, when a standby transfer request is sent from the PC 2 shown in FIG. 2 to the projector 1 via the network 3, the network communication unit 13 sends a standby transfer request to the power control unit 11.

Next, the power control unit 11 sends an operation suppression request for transferring to active standby to the operation suppression control unit 14 (step S72).

The operation suppression control unit 14 refers to the table of FIG. 16 and determines the operation suppression target (step S73).

Then, the operation suppression control unit 14 sends an operation suppression request to the module that needs to be subjected to operation suppression. In this example, the operation suppression request is sent to the function executing unit 15 (step S74).

Meanwhile, when the module of the function executing unit 15, which has received the operation suppression request, completes operation suppression for itself, the function executing unit 15 reports operation suppression completion indicating that operation suppression has been completed to the operation suppression control unit 14 (step S75).

Then, when a response indicating operation suppression completion is received from the function executing unit 15, the operation suppression control unit 14 sends a response indicating operation suppression completion to the power control unit 11 (step S76). The power control unit 11 that has received this response executes a process for transferring the power state to active standby.

Furthermore, the module that has received the operation suppression request can recognize which power state the projector 1 is in, and can determine which function the module itself can execute based on the information in the table of FIG. 17.

In this case, the function executing unit 15 refers to the table of FIG. 17, and can determine that in active standby, function A and function B can be executed but function C and function D cannot be executed.

Next, a description is given of a process performed when a module that is an operation suppression target receives a process request.

Figure 19:
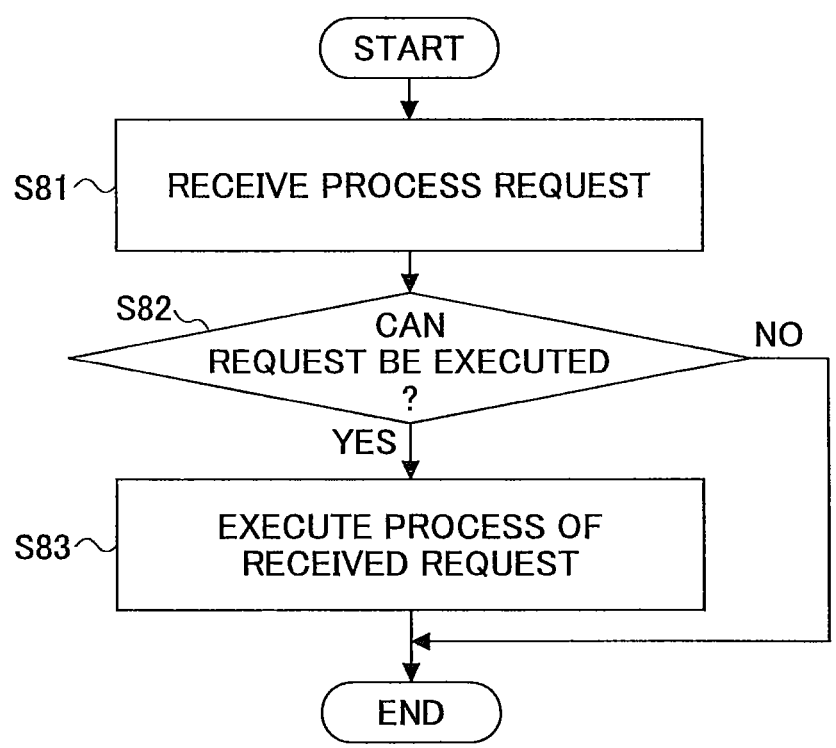
FIG. 19 is a flowchart illustrating a process performed when modules of the projector shown in FIG. 1 that are operation suppression targets receive a process request.

FIG. 19 is a flowchart illustrating a process performed when modules of the projector 1 shown in FIG. 1 that are operation suppression targets receive a process request. In FIG. 19, the steps are indicated as "S". In this process, the modules that are operation suppression targets are the function executing units 15 and 16.

This process is executed when the projector 1 is in a power on state.

In step S81, when the function executing units 15 and 16 receive a process request, in step S82, the function executing units 15 and 16 determine whether the request can be executed. When the request can be executed (YES in step S82), the process proceeds to step S83. When the request cannot be executed (NO in step S82), the process ends.

In step S83, the function executing units 15 and 16 execute the requested process, and the process ends.

In the process of step S82, when the request can be executed in the module itself in the present state, the function executing units 15 and 16 execute the requested process (step S83). Meanwhile, when the request cannot be executed in the module itself in the present state, nothing is performed and the process ends.

Figure 20:
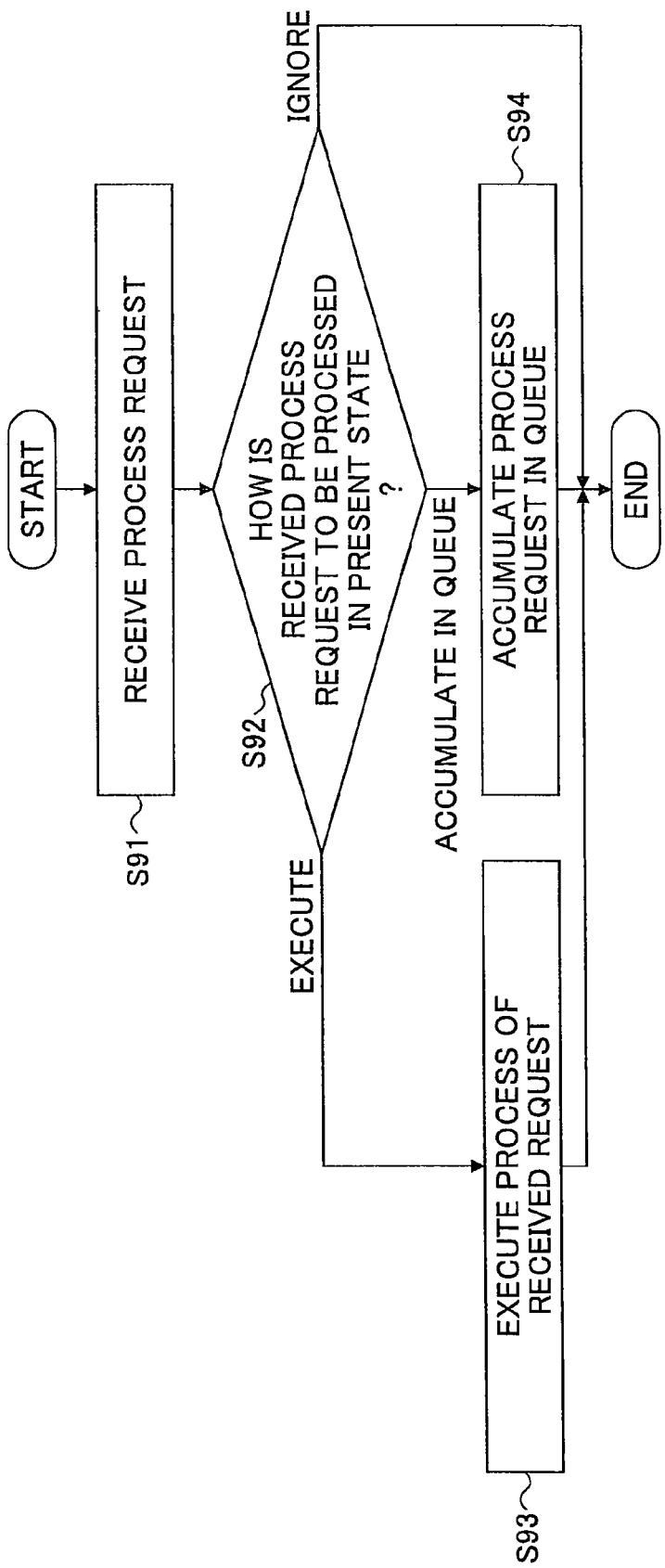
FIG. 20 is a flowchart illustrating another example of a process performed when modules of the projector shown in FIG. 1 that are operation suppression targets receive a process request.

Next, with reference to FIG. 20, a description is given of a process performed when a module that is an operation suppression target receives a process. In this case, the operation suppression includes accumulating requests in a queue.

FIG. 20 is a flowchart illustrating another example of a process performed when modules of the projector 1 shown in FIG. 1 that are operation suppression targets receive a process request. In FIG. 20, the steps are indicated as "S". This process is executed when the projector 1 is in a power on state. In this example, a description is given of a process performed by the function executing unit 15 shown in FIG. 1.

In step S91 of FIG. 20, when the function executing unit 15 receives a process request, in step S92, the function executing unit 15 determines how the received process request is to be processed in the present state (of the module itself). When the request is to be executed, the process proceeds to step S93. When the request is to be accumulated in a queue, the process proceeds to step S94. When the request is to be ignored, the process ends.

In step S93, the requested process is executed, and the process ends.

In step S94, process request is accumulated in a queue, and the process ends.

When the module that is an operation suppression receives a request, and there are only two methods, i.e., "execute" or "ignore", the following is required. That is, in a case where there is a request that cannot be executed during operation suppression, but this request is to be executed at a timing when operation suppression is released, the request source needs to send the request again.

In order to avoid this, in the process shown in FIG. 20, the module that is the operation suppression target "accumulates the request in a queue".

As the data structure for accumulating requests, a general queue is described; however, any kind of data structure may be used.

Furthermore, as to the method of determining how to process each request performed by the module that is the operation suppression target, and the flow of processing requests accumulated in the queue when operation suppression is released, are described below.

Next, three methods may be taken for each request received while a module that is an operation suppression is being subjected to operation suppression, i.e., execute, accumulate in a queue and execute later, or ignore.

The methods to be taken for the respective requested functions may be held in a table by each of the modules.

FIG. 21 illustrates an example of a table held by the module of the projector 1 shown in FIG. 1 that is an operation suppression target, indicating how to process each request during operation suppression.

In this example, a process performed by the function executing unit 15 is described.

The function executing unit 15 stores the table shown in FIG. 21 in advance, and therefore the function executing unit 15 refers to this table, and during active standby, the function executing unit 15 executes function A, accumulates the requests for function B and function C in a queue, and ignores and does not execute an execution request for function D.

Furthermore, during regular standby, the function executing unit 15 ignores and does not execute execution requests for function A through function D.

Figure 22:
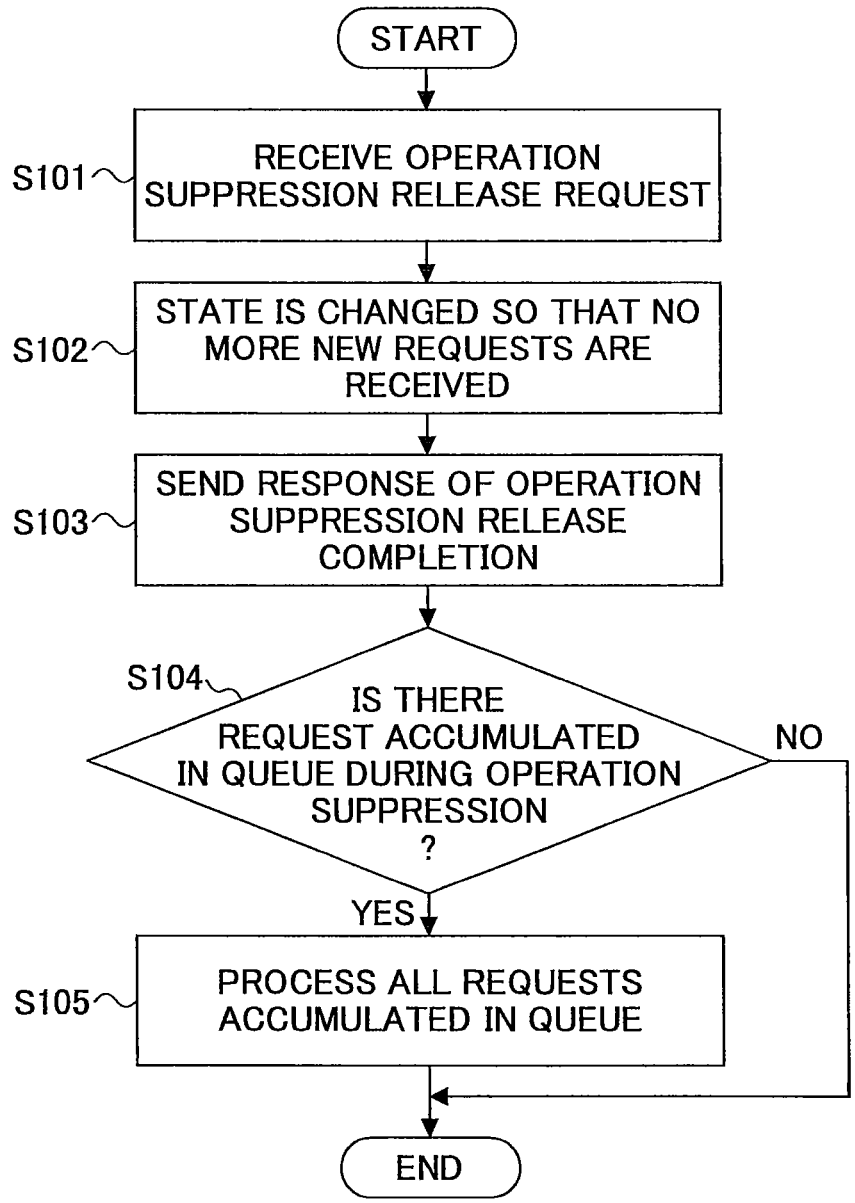
FIG. 22 is a flowchart of a process of executing all requests, which have been received during operation suppression, at the time when operation suppression is released, at the module of the projector shown in FIG. 1 that is an operation suppression target.

Next, with reference to FIG. 22, a description is given of a process of executing all requests, which have been received during operation suppression, at the time when operation suppression is released, at the module that is an operation suppression target.

FIG. 22 is a flowchart of a process of executing all requests, which have been received during operation suppression, at the time when operation suppression is released, at the module of the projector 1 shown in FIG. 1 that is an operation suppression target. In FIG. 22, the steps are indicated as "S".

In this example, a description is given of a process performed by the function executing unit 15.

This process is executed when the projector 1 is in a power on state.

In step S101 of FIG. 22, when an operation suppression release request is received, in step S102, the function executing unit 15 changes the state of the module itself so that subsequent requests can be received. In step S103, the function executing unit 15 sends a response indicating operation suppression release completion. In step S104, the function executing unit 15 determines whether there are any requests accumulated in a queue during operation suppression. When there is an accumulated request (YES in step S104), in step S105, the function executing unit 15 processes all requests accumulated in the queue, and the process ends.

Meanwhile, when there are no requests accumulated during operation suppression (NO in step S104), the process ends.

As described above, after returning a response to the operation suppression control unit 14, the function executing unit 15 executes the processes accumulated in the queue, and therefore no process requests remain unprocessed.

Figure 23:
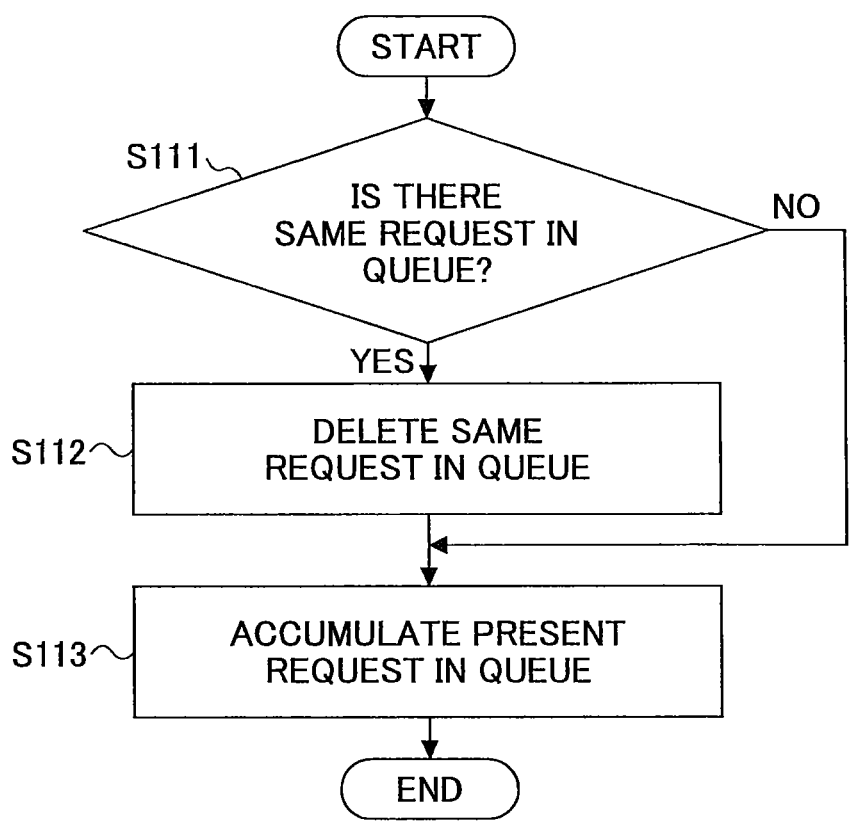
FIG. 23 is a flowchart of a process performed by the projector shown in FIG. 1, for removing an old request when the same request is received when accumulating requests in a queue.

Next, with reference to FIG. 23, a description is given of a process of removing an old request when the same request is received when accumulating requests in a queue.

FIG. 23 is a flowchart of a process performed by the projector 1 shown in FIG. 1, for removing an old request when the same request is received when accumulating requests in a queue. In FIG. 23, the steps are indicated as "S".

In this example, a description is given of a process performed by the function executing unit 15.

This process is executed when the projector 1 is in a power on state, and is executed instead of step S94 of FIG. 20.

In step S111 of FIG. 23, the function executing unit 15 determines whether there is the same request as the presently received request in the queue. When there is a same request (YES in step S111), the function executing unit 15 deletes the same request from the queue in step S112, and accumulates the presently received request in the queue in step S113, and the process ends.

Meanwhile, when there are no same requests (NO in step S111), the function executing unit 15 accumulates the presently received request in the queue in step S113, and the process ends.

As described above, it is possible to prevent a case where the same requests are accumulated in duplicate in a queue.

According to the projector 1 according to the present embodiment, when a request to transfer to standby is received, operation suppression is applied to a module that receives requests from outside so that new requests are not received. Therefore, it is possible to prevent a module from transferring to standby in a state where execution of a requested process is not completed.

Furthermore, it is possible to quickly transfer to a standby state without executing a process requested after a standby transfer request is received.

Furthermore, it is possible to transfer to a standby state after executing a process requested before receiving the standby transfer request.

Furthermore, operation suppression can be first applied to a module that is to be used, when there are modules in a dependency relationship (for example, the network communication unit 13 and the function executing units 15 through 17 shown in FIG. 1).

Furthermore, operation suppression can be first released for a module that is to be used, when there are modules in a dependency relationship (for example, the network communication unit 13 and the function executing units 15 through 17 shown in FIG. 1).

Furthermore, by giving an operation suppression request only to the requisite minimum modules, it is possible to quickly transfer the power state.

Furthermore, even during operation suppression, when there is a function that can be executed, it is possible to execute the function.

Furthermore, there is no need for a user to send a request again after operation suppression is released.

Furthermore, when a request that is the same as a request accumulated during operation suppression is received, only the new request is executed. Therefore, it is possible to prevent the same process from being needlessly executed two times, so that the time taken to execute accumulated processes is reduced.

Next, a description is given of another embodiment of the present invention.

Figure 24:
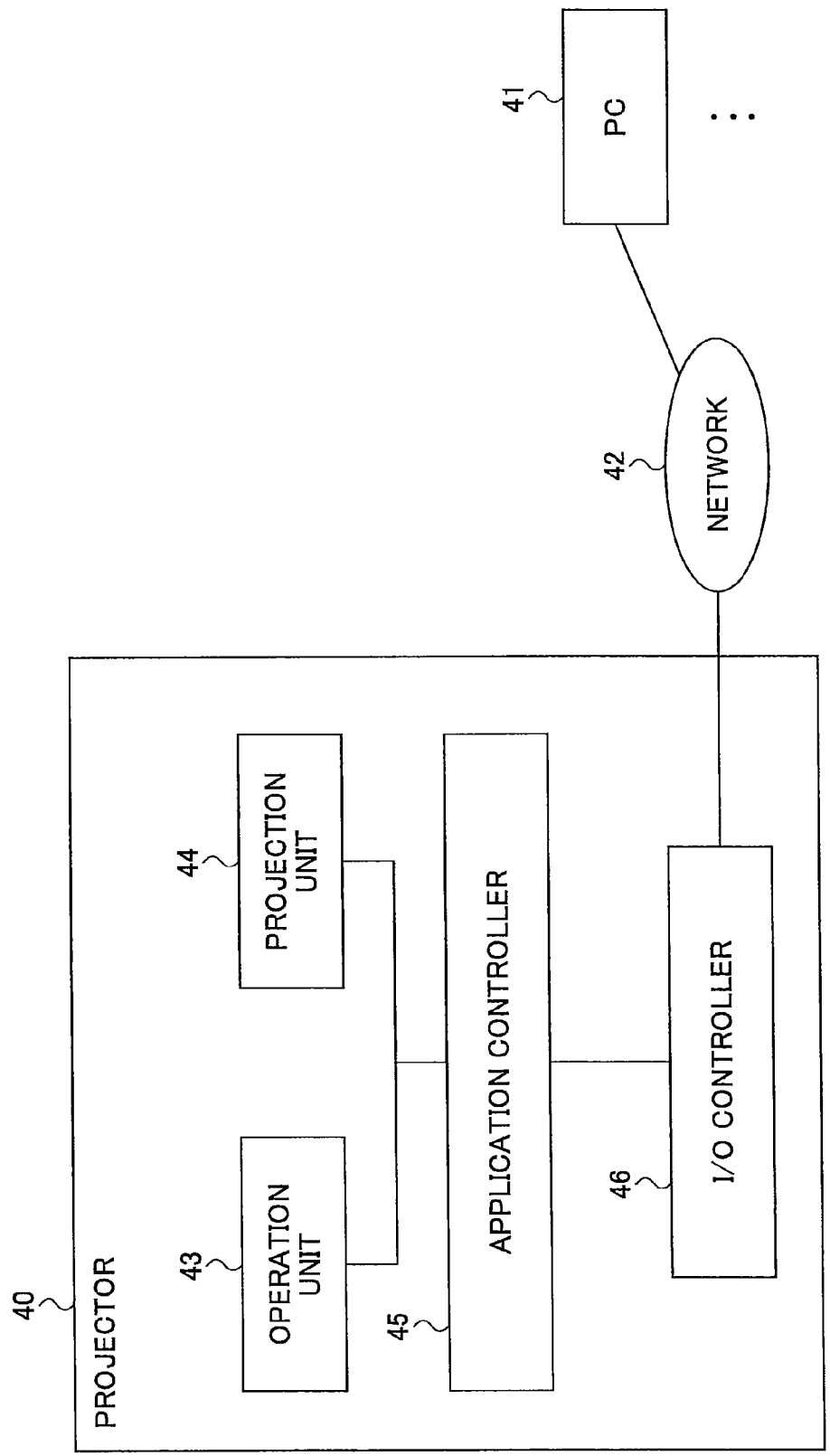
FIG. 24 illustrates a configuration of a projection system according to another embodiment of the present invention.

FIG. 24 illustrates a configuration of a projection system according to another embodiment of the present invention.

In the projection system, a plurality of personal computers including a PC 41 are connected to a projector 40 that is an example of a processing device via a wired or wireless network 42. The PC 41 and the projector 40 can perform data communication with each other. PCs other than the PC 41 are not shown.

The projector 40 is a video projection device (also referred to as an "image projection device"), and projects a video based on projection data input from the PC 41 onto a projection surface such as a screen.

The projector 40 includes an operation unit 43, a projection unit 44, an application controller 45, and an input output (I/O) controller 46.

The operation unit 43 includes hard keys and a remote controller light receiving unit, and is used by the user for inputting various kinds of operation information to the projector 40.

The projection unit 44 projects images such as still images and video images on a projection surface such as a screen, based on image data (also referred to as "video data") sent from the PC 41.

The application controller 45 includes microcomputers such as a CPU, a ROM, and a RAM, and performs application-like processes such as processing data received from the I/O controller 46 to convert the data for passing to the projection unit 44.

The I/O controller 46 also includes microcomputers such as a CPU, a ROM, and a RAM, and performs input output processes with the network 42.

The application controller 45 and the I/O controller 46 are realized by different processing chips, and respectively perform collaborative processes.

The PC 41 sends video data to the projector 40.

Figure 25:
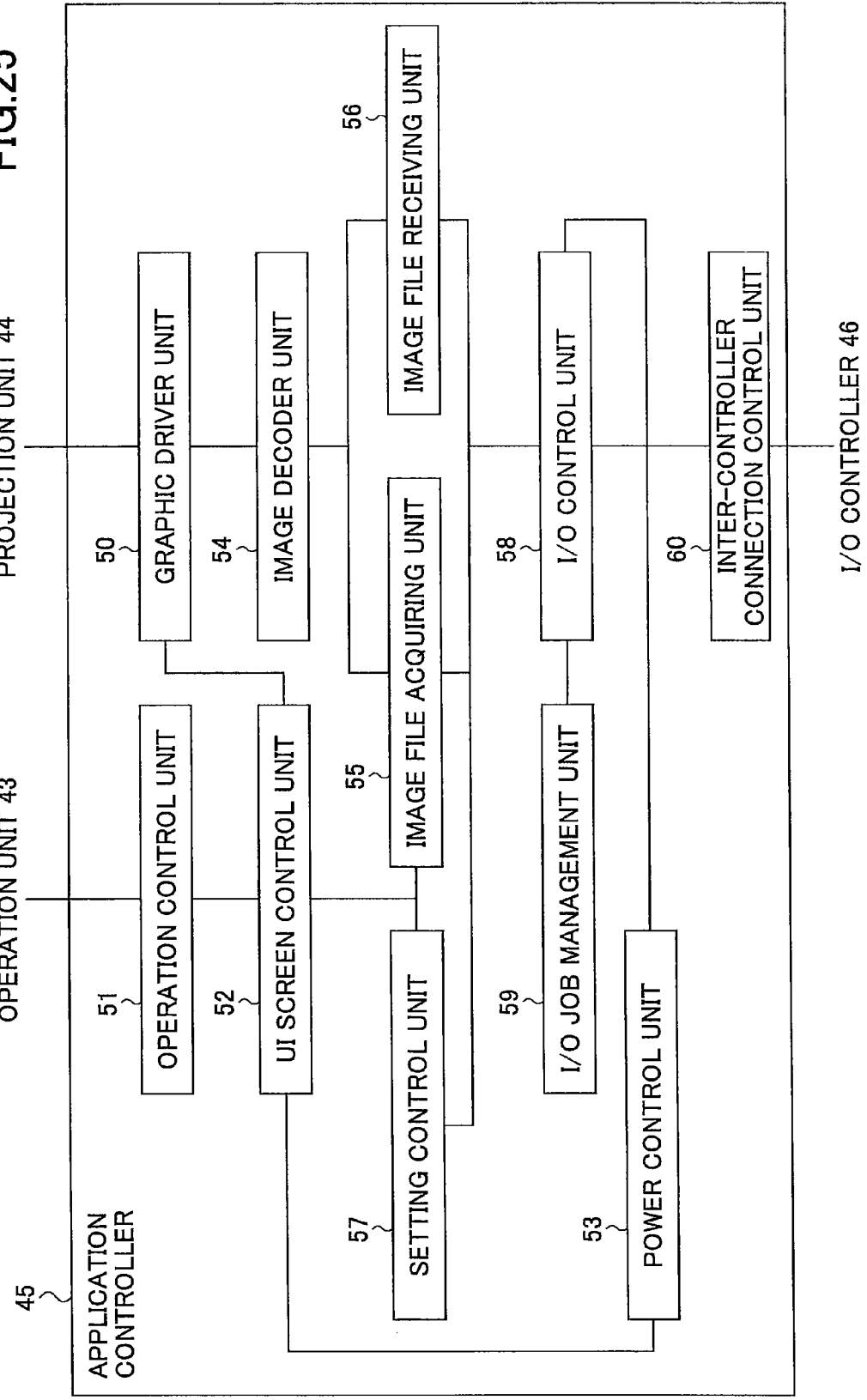
FIG. 25 is a block diagram of a functional configuration inside the application controller shown in FIG. 24.

FIG. 25 is a block diagram of a functional configuration inside the application controller 45 shown in FIG. 24.

The application controller 45 includes a graphic driver unit 50, an operation control unit 51, a user interface (UI) screen control unit 52, a power control unit 53, an image decoder unit 54, an image file acquiring unit 55, an image file receiving unit 56, a setting control unit 57, an I/O control unit 58, an I/O job management unit 59, and an inter-controller connection control unit 60, which are functional units realized by a microcomputers.

The graphic driver unit 50 passes projection data to the projection unit 44 to be projected.

The operation control unit 51 receives input from the operation unit 43.

The UI screen control unit 52 generates a UI screen according to input from the operation control unit 51, and displays the UI screen.

The power control unit 53 controls power on and power off of the application controller 45 according to UI operation. That is to say, the power control unit 53 controls the power state of the application controller 45.

The image decoder unit 54 decodes the image data, so that the image data is converted into byte rows that can be projected.

The image file acquiring unit 55 accesses the PC 41 connected to the network 42 or a server (not shown), and acquires an image file.

The image file receiving unit 56 receives image files sent form the PC 41 connected to the network 42, etc.

The setting control unit 57 sets and acquires various setting values of the projector 40.

The I/O control unit 58 receives requests from the image file acquiring unit 55 and the image file receiving unit 56, and exchanges messages with the inter-controller connection control unit 60, to send requests and responses to the I/O controller 46.

Furthermore, when power off is instructed from the power control unit 53, the I/O control unit 58 waits for process completion of a job managed by the I/O job management unit 59, so as to transfer to a power off state at the time point when there are no more jobs in progress.

Furthermore, when power off is instructed from the power control unit 53, the I/O control unit 58 cancels the job managed by the I/O job management unit 59, so as to transfer to a power off state at the time point when there are no more jobs in progress.

Furthermore, when power off is instructed from the power control unit 53, the I/O control unit 58 cancels any jobs that can be cancelled, and waits for process completion of jobs that cannot be cancelled, so as to transfer to a power off state at the time point when there are no more jobs in progress.

Furthermore, the I/O control unit 58 makes it possible to cancel processes relevant to network transmission/reception, and as for processes other than processes relevant to network transmission/reception, process completion is waited without cancelling these other processes.

Furthermore, when the I/O control unit 58 cancels jobs, the I/O control unit 58 sends information of a communication thread held in the job information to the I/O controller 46.

The I/O job management unit 59 stores and manages the state of the job in progress implemented by the I/O control unit 58.

Furthermore, the I/O job management unit 59 holds information indicating whether it is possible to cancel a job, according to the type of job.

Furthermore, the I/O job management unit 59 holds information of a communication thread used as job information.

Furthermore, the I/O job management unit 59 holds information indicating whether a job is in a state that can be cancelled, according to the type of job. When cancelling a job, the state of the job at that time point is checked to determine whether the job can be cancelled.

The inter-controller connection control unit 60 exchanges data such as messages with the I/O controller 46.

Figure 26:
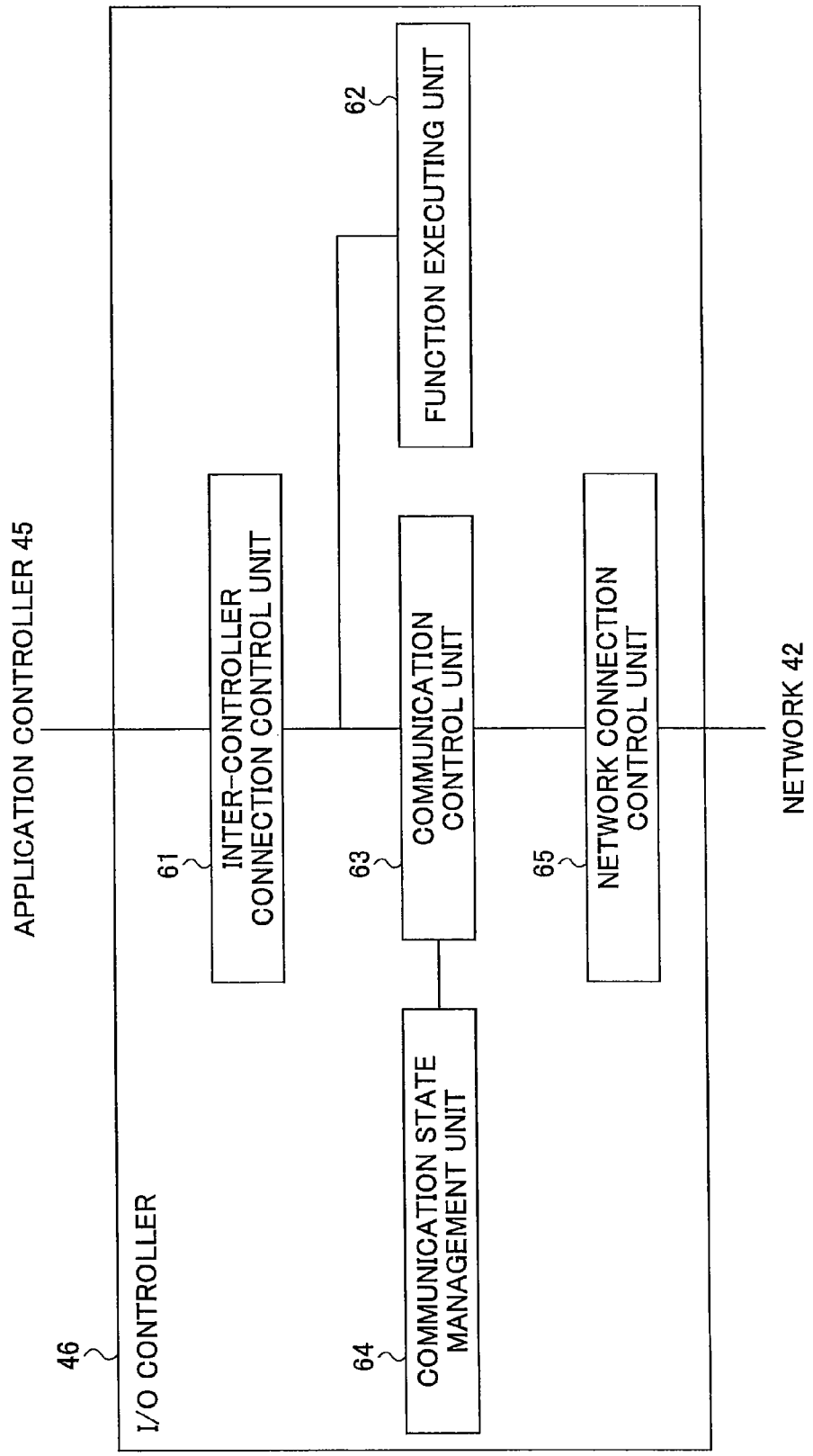
FIG. 26 is a block diagram of the functional configuration inside the I/O controller shown in FIG. 24.

FIG. 26 is a block diagram of the functional configuration inside the I/O controller 46 shown in FIG. 24.

The I/O controller 46 includes an inter-controller connection control unit 61, a function executing unit 62, a communication control unit 63, a communication state management unit 64, and a network connection control unit 65, which are functional units realized by a microcomputers.

The inter-controller connection control unit 61 exchanges data such as messages with the inter-controller connection control unit 60 in the application controller 45 shown in FIG. 25.

The function executing unit 62 includes plural processing units, which respectively perform the actual processes according to messages passed from the application controller 45. That is to say, the function executing unit 62 performs processes requested from the application controller 45.

The communication control unit 63 accesses the network 42 using the network connection control unit 65, and controls network transmission/reception via the network connection control unit 65.

Furthermore, the communication control unit 63 controls a cancel process for communication of a communication thread that is transmitted.

Furthermore, when a request to cancel a network process is received, the communication control unit 63 executes cancellation when it is possible to cancel the process, and waits for the process to end without cancelling the process when it is not possible to cancel the process.

The communication state management unit 64 stores and manages the state of the communication thread used for network communication. As for threads assigned for communication, the communication state management unit 64 holds information indicating the communication state of each thread.

Furthermore, the communication state management unit 64 holds information indicating whether each network process can be cancelled, and holds information indicating whether the process can be cancelled for each purpose/state of the communication threads. When cancelling a network process, the communication state management unit 64 cross-checks the purpose/state of a communication thread at this time point with the held information, and determines whether the network process can be cancelled.

The network connection control unit 65 controls the connection of the projector shown in FIG. 24 with an external network 42.

The operation control unit 51 shown in FIG. 25 and the network connection control unit 65 shown in FIG. 26 function as the input unit described above.

Furthermore, the function executing unit 62 shown in FIG. 26 functions as the processing unit described above.

Furthermore, the power control unit 53 shown in FIG. 25 functions as the power control unit described above.

Furthermore, the I/O control unit 58 shown in FIG. 25 functions as the operation suppression control unit described above.

Next, with reference to FIG. 27, a description is given of a table stored and held by the I/O job management unit 59 shown in FIG. 25.

FIG. 27 illustrates an example of a table held by the I/O job management unit 59 shown in FIG. 25, including information indicating whether it is possible to cancel message types.

The I/O job management unit 59 stores the table shown in FIG. 27 in advance.

This table includes message contents and whether the message can be cancelled for each message type.

The message type is identification information (ID) indicating the message type in the I/O controller 46.

Furthermore, the message contents are information indicating the contents of the process performed at the I/O controller 46 for each message type.

Furthermore, the possibility of cancelling is information indicating whether the process of the message can be canceled in the middle.

By referring to this table, the I/O job management unit 59 can determine whether a process can be cancelled for each message type indicated by a job.

FIG. 28 illustrates an example of a table held by the I/O job management unit 59 shown in FIG. 25, for managing jobs.

The I/O job management unit 59 also stores the table shown in FIG. 28 in advance.

In this table, the thread ID, the job state, and the receiver are registered for each message type.

The message type is identification information (ID) indicating the message type in the I/O controller 46.

The thread ID is identification information indicating the thread of the I/O controller 46 at which the job is executed. When starting and cancelling a job, this thread ID needs to be specified.

Furthermore, a job state is information indicating contents such as the present state of the job, for example, whether a request is being sent to the I/O controller 46 or whether a response from the I/O controller 46 is being waited.

Furthermore, the receiver is information indicating the functional unit that is the input output destination of the job.

In the table of FIG. 28, as candidates of the receiver, the setting control unit 57, the image file acquiring unit 55, and the image file receiving unit 56 of FIG. 25 are registered.

The setting control unit 57, the image file acquiring unit 55, and the image file receiving unit 56 exchange information with the I/O controller 46 via the I/O control unit 58 to proceed with processes as applications.

Furthermore, when determining whether a job can be cancelled, the I/O job management unit 59 extracts the message type of each job, determines whether the job can be cancelled by referring to the setting of the possibility of cancelling in the table shown in FIG. 27, and when the job can be cancelled, the I/O job management unit 59 specifies the thread ID of the job and requests the I/O controller 46 to cancel the job.

Next, with reference to FIG. 29, a description is given of a thread state management table stored and held by the communication state management unit 64 shown in FIG. 26.

FIG. 29 illustrates an example of a thread state management table held by the communication state management unit 64 shown in FIG. 26.

The communication state management unit 64 stores the table shown in FIG. 29 in advance.

In this table, the purpose, state, and user of each thread ID are registered.

A thread ID is identification information indicating the thread of the I/O controller 46 at which a job is executed. When starting and cancelling a job, this thread ID needs to be specified.

The communication state management unit 64 can identify the thread operating in the I/O controller 46 by referring to this table.

Next, the purpose is information indicating the communication of a function of which the thread is in charge.

In this table, information indicating that the threads are in charge of a HTTP server function and a HTTP client function is recorded.

The state is information indicating the communication process state of the thread.

The user is information indicating the functional unit of the input output destination of the job.

It is indicated whether the session processed by the thread is being performed with the image file acquiring unit 55 or the image file receiving unit 56 shown in FIG. 25, which are registered in the table of FIG. 28.

The setting control unit 57 does not perform network communication, and thus does not appear in this table.

The contents of the table in FIG. 29 are used when returning a response to the application controller 45.

When starting communications, a thread is specified to start a communication process.

When executing cancellation, the communication state management unit 64 specifies the thread ID from the application controller 45 and cancels the process of the corresponding thread.

Next, with reference to FIG. 30, a description is given of an example of a process performed until generating a job, performed by the projector 40.

FIG. 30 is a sequence diagram illustrating a process performed until generating a job, performed by the projector 40 shown in FIG. 24. In FIG. 30, the steps are indicated as "S".

In this process, the image file acquiring unit 55 shown in FIG. 25 sends a request for acquiring an image file, to a server (not shown) connected to the network 42.

This process is executed when the projector 40 is in a power on state.

In step S121 of FIG. 30, the image file acquiring unit 55 sends a network transmission request to the I/O control unit 58.

Next, in step S122, the I/O control unit 58 instructs the I/O job management unit 59 to generate a new job.

In step S123, the I/O control unit 58 sends a message to request network transmission to the inter-controller connection control unit 60.

Next, in step S124, the inter-controller connection control unit 60 in the application controller 45 transfers the message to the inter-controller connection control unit 61 of the I/O controller 46.

In step S125, the inter-controller connection control unit 61 of the I/O controller 46 sends the message received from the application controller 45 to the communication control unit 63.

Next, in step S126, the communication control unit 63 causes the communication state management unit 64 to update the communication state of the communication thread to be used to a transmitting state.

In step S127, the communication control unit 63 causes the network connection control unit 65 to execute network transmission.

In the sequence of FIG. 30, network communication is performed, and therefore a message is passed to the communication control unit 63 in step S125. However, depending on the type of message, the message is passed to the function executing unit 62 shown in FIG. 26. In this case, steps S126 and S127 are not performed.

Next, with reference to FIG. 31, a description is given of an example of a process performed until deleting a job, performed by the projector 40.

FIG. 31 is a sequence diagram illustrating a process performed until deleting a job performed by the projector 40 shown in FIG. 24. In FIG. 31, the steps are indicated as "S".

This process is executed when the projector 40 is in a power on state.

In this process, as a continuation of the process of the sequence shown in FIG. 30, a response of network transmission by the image file acquiring unit 55 shown in FIG. 25 is returned.

In step S131 of FIG. 31, the network connection control unit 65 returns, to the communication control unit 63, a response of network transmission indicating that network transmission has been completed.

Next, in step S132, the communication control unit 63 causes the communication state management unit 64 to update the communication state. In this case, the state of the communication thread that has been used is updated to transmission completed (waiting for reception).

Subsequently, in step S133, the communication control unit 63 sends a message response to the inter-controller connection control unit 61 by using the response of network transmission as a response of the message received in the process of FIG. 30.

Next, in step S134, the inter-controller connection control unit 61 of the I/O controller 46 transfers the message to the inter-controller connection control unit 60 of the application controller 45.

In step S135, the inter-controller connection control unit 60 sends the received message response to the I/O control unit 58.

Then, in step S136, the I/O control unit 58 deletes the job from the I/O job management unit 59 because network transmission is completed.

Then, in step S137, the I/O control unit 58 sends a result for reporting that network transmission is completed, to the image file acquiring unit 55.

Similar to the sequence of FIG. 30, network communication is performed in the sequence of FIG. 31, and therefore the sequence starts where the network connection control unit 65 returns a response to the communication control unit 63 in step S131. However, when the function executing unit 62 shown in FIG. 26 has been performing the process, the sequence starts where the function executing unit 62 returns a message response to the inter-controller connection control unit 61 (corresponding to step S133). In this case, steps S131 and S132 are not performed.

Next, with reference to FIG. 32, a description is given of an example of a process performed until deletion of a job by cancelling the job, performed by the projector 40.

FIG. 32 is a sequence diagram illustrating a process performed until deleting a job by cancelling the job, performed by the projector 40 shown in FIG. 24. In FIG. 32, the steps are indicated as "S".

This process is executed when the projector 40 is in a power on state.

In this process, as a continuation of the process of the sequence shown in FIG. 30, a description is given of ending the process by cancelling the process, instead of ending the process by completing the process as in the case of the sequence of FIG. 31.

In step S141 of FIG. 32, the image file acquiring unit 55 of the application controller 45 in FIG. 25 sends a request to cancel the requested network transmission to the I/O control unit 58.

In step S142, the I/O control unit 58 confirms that there is a job for which cancel is requested in the I/O job management unit 59.

In step S143, the I/O control unit 58 sends a cancel request message to the inter-controller connection control unit 60.

In step S144, the inter-controller connection control unit 60 of the application controller 45 transfers the message to the inter-controller connection control unit 61 of the I/O controller 46 shown in FIG. 26.

In step S145, the inter-controller connection control unit 61 of the I/O controller 46 sends the received message to the communication control unit 63.

In step S146, the communication control unit 63 causes the communication state management unit 64 to confirm the state of the communication for which cancel is requested.

In step S147, the communication control unit 63 instructs the network connection control unit 65 to cancel communication.

In step S148, the communication control unit 63 causes the communication state management unit 64 to update the communication state. In this case, the state of the thread of the cancelled communication is updated to standby.

In step S149, the communication control unit 63 sends a response of the message to the inter-controller connection control unit 61 as a response of step S145.

In step S150, the message is transferred from the inter-controller connection control unit 61 of the I/O controller 46 to the inter-controller connection control unit 60 of the application controller 45 shown in FIG. 25.

In step S151, the inter-controller connection control unit 60 sends the received message response to the I/O control unit 58.

In step S152, the I/O control unit 58 deletes the job from the I/O job management unit 59 because network transmission has been cancelled.

In step S153, the I/O control unit 58 sends the cancel result to the image file acquiring unit 55 to report that cancel has been completed.

Figure 33:
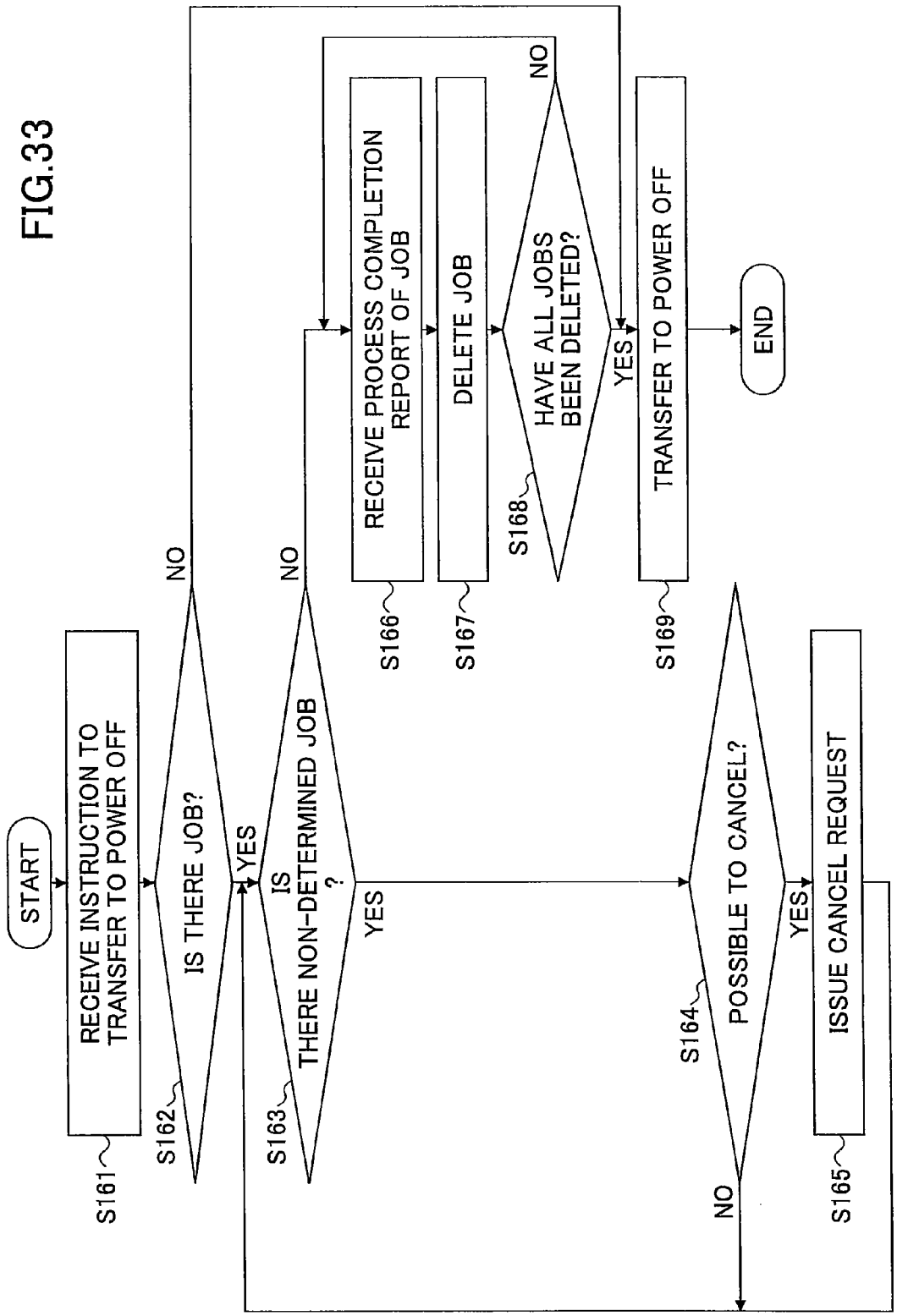
FIG. 33 is a flowchart illustrating a process performed until the power is turned off, performed by the I/O control unit and the I/O job management unit shown in FIG. 25.

Next, with reference to FIG. 33, a description is given of a process performed until the power is turned off, performed by the I/O control unit 58 and the I/O job management unit 59 shown in FIG. 25.

FIG. 33 is a flowchart illustrating a process performed until the power is turned off, performed by the I/O control unit 58 and the I/O job management unit 59 shown in FIG. 25. In FIG. 33, the steps are indicated as "S".

This process is executed when the projector 40 is in a power on state.

In step S161, when an instruction to transfer to power off is received from the power control unit 53 shown in FIG. 25, the process proceeds to step s162. To the power control unit 53, an instruction to transfer to power off is given by an operation to the operation unit 43 such as pressing the power switch.

In step S162, the I/O control unit 58 instructs the I/O job management unit 59 to determine whether there is a job. When there is no job (NO in step S162), in step S169, the projector 40 transfers to power off (standby state), and the process ends.

When there is a job (YES in step S162), the process proceeds to step S163.

In step S163, it is determined whether there is a non-determined job for which a determination as to cancel or to standby is not made in the I/O job management unit 59. When there is a non-determined job (YES in step S163), the process proceeds to step S164. When there are no non-determined jobs (NO in step S163), i.e., when a determination has been made for all of the jobs, the process proceeds to step S166.

In step S164, it is determined whether the job can be cancelled. When the job cannot be cancelled (NO in step S164), the process returns to step S163, and a determination is made for the next job.

When the job can be cancelled (YES in step S164), in step S165, a cancel request is issued, and the process returns to step S163 and a determination is made for the next job.

Meanwhile, in step S166, a process completion report for each job is received indicating that cancellation of the job is completed or the process has been fully completed, in step S167, the reported jobs are deleted from the I/O job management unit 59, and the process proceeds to step S168.

In step S168, it is determined whether all jobs have been deleted. When there is a job that has not been deleted (NO in step S168), the process returns to step S166, and the next job is deleted.

When all jobs have been deleted (YES in step S168), and the deletion of all jobs has been completed and there are no jobs in the I/O job management unit 59, in step S169, the projector transfers to a power off state, and the process ends.

Figure 34:
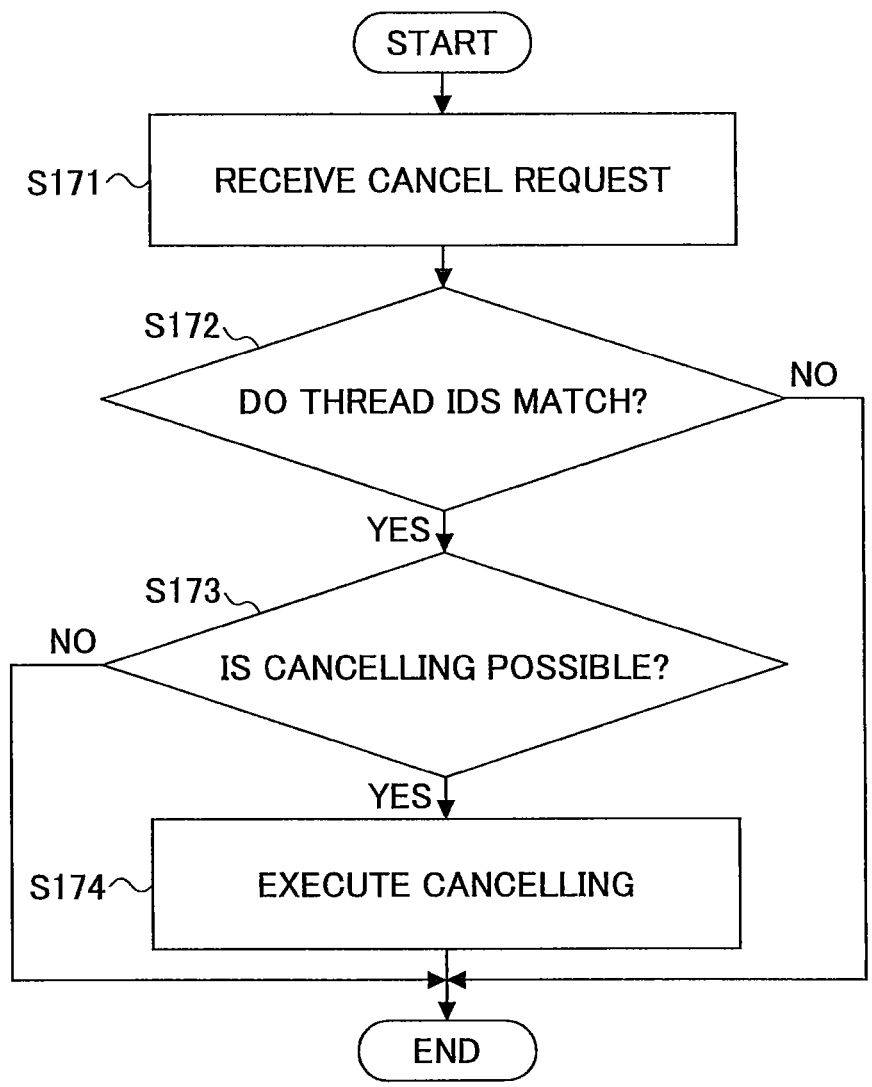
FIG. 34 is a flowchart illustrating a cancel process performed by the communication control unit and the communication state management unit shown in FIG. 26.

Next, with reference to FIG. 34, a description is given of a cancel process performed by the communication control unit 63 and the communication state management unit 64 shown in FIG. 26.

FIG. 34 is a flowchart illustrating a cancel process performed by the communication control unit 63 and the communication state management unit 64 shown in FIG. 26. In FIG. 34, the steps are indicated as "S".

This process is executed when the projector 40 is in a power on state.

In step S171, when a cancel request is received from the application controller 45, the communication control unit 63 sends an instruction to the communication state management unit 64 and the process proceeds to step S172.

In step S172, the communication state management unit 64 determines whether there is a thread that matches the thread ID specified in the cancel request, and when there is a matching thread (YES in step S172), the process proceeds to step S173.

When there is no thread that matches the thread ID specified in the cancel request (NO in step S172), the process ends.

In step S173, the communication state management unit 64 determines whether it is possible to cancel the communication process of the specified thread. When the communication process cannot be cancelled (NO in step S173), the process ends. When the process ends without cancelling the thread, the communication continues until the process is completed. In another example, the communication state may be divided into several stages, and after the communication reaches a state where cancelling is possible, a cancel request may be received again to cancel the communication.

When the communication process can be cancelled (YES in step S173), in step S174, the communication control unit 63 cancels the communication process, and the process ends.

Next, a description is given of a table stored and held by the I/O job management unit 59 shown in FIG. 25, indicating whether cancelling is possible in the respective job states.

FIG. 35 illustrates an example of a table stored and held by the I/O job management unit 59 shown in FIG. 25, indicating whether cancelling is possible in the respective job states.

The I/O job management unit 59 stores the table shown in FIG. 35 in advance.

In this table, information relevant to the job states of each message type and whether cancelling is possible is registered.

The message type is identification information (ID) indicating the message type in the I/O controller 46.

The job state is information indicating the present state of the job, for example, whether a request is being sent to the I/O controller 46 or whether a response from the I/O controller 46 is being waited.

The possibility of cancelling is information indicated whether the job can be cancelled according to the message type and job state.

The I/O control unit 58 refers to the table shown in FIG. 35, and determines whether a job can be cancelled according to the message type and job state.

Next, a description is given of a table stored and held by the communication control unit 63 shown in FIG. 26, indicating whether cancelling is possible according to the purpose and state of the communication thread.

FIG. 36 illustrates an example of a table stored and held by the communication control unit 63 shown in FIG. 26, indicating whether cancelling is possible according to the purpose and state of the communication thread.

The communication control unit 63 stores the table shown in FIG. 36 in advance.

In this table, information relevant to the state of each purpose and whether cancelling is possible is registered.

The purpose is information indicating the communication of a function of which the thread is in charge.

The state is information indicating the communication process state of the thread.

The possibility of cancelling is information indicating whether the communication thread can be cancelled at the corresponding purpose/state.

The communication control unit 63 refers to the table shown in FIG. 36, and when the communication control unit 63 cancels a communication thread, the communication control unit 63 determines whether the communication thread can be cancelled according to the purpose and state of the communication thread.

According to the projector 40 according to the present embodiment, when power off is instructed, a job that is not yet in progress is cancelled, and the projector 40 transfers to power of a the time point when there are no more jobs in progress. Therefore, the safety in the power off process can be improved and the time taken until power off can be reduced.

Furthermore, by cancelling jobs relevant to network transmission/reception, the time taken to perform the power off process can be reduced.

Furthermore, when it is safer not to cancel a job depending on the job type, or when processing time can be reduced by not cancelling a job, such a job is executed without being cancelled. Therefore, the safety in the power off process can be improved and the time taken until power off can be reduced.

In embodiments of the present invention, the specific configurations of the respective units, the process contents, and data formats are not limited to those described in the above embodiment.

Furthermore, in the above embodiment, the present invention is applied to the projectors 1 and 40.

However, the present invention is applicable to any kind of processing device such as a fax machine, a scanner, a printer, and a copier, as long as the device has a function of transferring the power state to a power saving state such as a standby state.

Furthermore, the configurations described in the above embodiment may be arbitrarily combined as long as there is no incoherence.

According to one embodiment of the present invention, a processing device is provided, which is capable of preventing failures caused when the processing device transfers to a power saving state while a function is being executed, and capable of quickly transferring to a power saving state without receiving new requests while transferring to a power saving state.

The processing device is not limited to the specific embodiments described herein, and variations and modifications may be made without departing from the scope of the present invention.

The present application is based on Japanese Priority Patent Application No. 2012-000761, filed on Jan. 5, 2012, the entire contents of which are hereby incorporated herein by reference.

What is claimed is:

1. A processing device, comprising:
   an input unit configured to input at least one process request;
   a processing unit configured to execute at least one process corresponding to the at least one process request input by the input unit;
   a power control unit configured to transfer the processing device into a power saving state, and to transfer the processing device back to a regular state from the power saving state; and
   an operation suppression control unit configured to send an operation suppression request to the input unit and the processing unit before the power control unit transfers the processing device into the power saving state, and to send an operation suppression release request to the input unit and the processing unit when the power control unit transfers the processing device back to the regular state from the power saving state,
   wherein, in response to the operation suppression release request, the processing unit is further configured to determine whether one or more process requests of the at least one process request remain unexecuted from when the processing device was in the power saving state,
   wherein, when the one or more process requests of the at least one process request remain unexecuted, the processing unit is further configured to:
   determine whether the unexecuted one or more process requests is a duplicate of another one or more process requests of the at least one process request received after the processing device has returned to the regular state, and delete the unexecuted one or more process requests if it is said duplicate, and
   execute one or more processes corresponding to the unexecuted one or more process requests that are not said duplicate, and to said another one or more process requests, and
   wherein the operation suppression control unit includes a request unit configured to:
   request the input unit and the processing unit to end the at least one process for which the at least one process request is received before the operation suppression request is received, and
   request the input unit and the processing unit to cancel the at least one process for which the at least one process request is received after the operation suppression request is received.

2. The processing device according to claim 1, wherein the input unit and the processing unit respectively include:
   a response unit configured to send a response of operation suppression to the operation suppression control unit after ending the at least one process for which the at least one process request is received before the operation suppression request is received from the operation suppression control unit, when the operation suppression request is received from the operation suppression control unit.

3. The processing device according to claim 1, wherein the operation suppression control unit includes a request unit configured to send the operation suppression request to the input unit and the processing unit in an order that is stored in advance.

4. The processing device according to claim 1, wherein the operation suppression control unit includes a request unit configured to send the operation suppression release request to the input unit and the processing unit in an order that is stored in advance.

5. The processing device according to claim 1, wherein the operation suppression control unit includes a request unit configured to send the operation suppression request to the input unit and the processing unit specified in advance.

6. The processing device according to claim 1, wherein the input unit and the processing unit respectively include:
   a receiving unit configured to receive the at least one process request for the at least one process specified in advance, in an operation suppression state after the operation suppression request is received from the operation suppression control unit.

7. The processing device according to claim 6, wherein the input unit and the processing unit respectively include:
   a control unit configured to not accumulate in duplicate those of the one or more process requests that are the same, with regard to the one or more process requests received during the operation suppression state.

8. The processing device according to claim 1, wherein the input unit and the processing unit respectively include a receiving unit configured to:
   receive the one or more process requests of the at least one process request for the one or more processes in an operation suppression state after the operation suppression request is received from the operation suppression control unit, accumulate the one or more process requests of the at least one process request that have been received, and execute the one or more processes corresponding to the one or more process requests that have been accumulated, when the operation suppression release request is received from the operation suppression control unit.

9. The processing device according to claim 1, wherein the input unit and the processing unit respectively include:
   a cancel unit configured to determine whether the at least one process for which the at least one process request is received before the operation suppression request is received can be cancelled, and to cancel the at least one process that is determined to be possible to cancel, when the operation suppression request is received from the operation suppression control unit.

10. A method performed by a processing device including an input unit configured to input at least one process request and a processing unit configured to execute at least one process corresponding to the at least one process request input by the input unit, the method comprising:
   transferring the processing device into a power saving state, and transferring the processing device back to a regular state from the power saving state;
   sending an operation suppression request to the input unit and the processing unit before the processing device is transferred into the power saving state;
   sending an operation suppression release request to the input unit and the processing unit when the processing device is transferred back to the regular state from the power saving state;
   determining, in response to the operation suppression release request, whether one or more process requests of the at least one process request remain unexecuted from when the processing device was in the power saving state;
   determining, when the one or more process requests of the at least one process request remain unexecuted, whether the unexecuted one or more process requests is a duplicate of another one or more process requests of the at least one process request received after the processing device has returned to the regular state, and deleting the unexecuted one or more process requests if it is said duplicate; and
   executing one or more processes corresponding to the unexecuted one or more process requests that are not said duplicate, and to said another one or more process requests,
   wherein the sending of the operation suppression request includes:
      requesting the input unit and the processing unit to end the at least one process for which the at least one process request is received before the operation suppression request is received, and
      requesting the input unit and the processing unit to cancel the at least one process for which the at least one process request is received after the operation suppression request is received.

11. The method according to claim 10, further comprising sending, by the input unit and the processing unit, a response of operation suppression after ending the at least one process for which the at least one process request is received before the operation suppression request is received, when the operation suppression request is received.

12. The method according to claim 10, wherein the sending of the operation suppression request includes sending the operation suppression request to the input unit and the processing unit in an order that is stored in advance.

13. The method according to claim 10, wherein the sending of the operation suppression release request includes sending the operation suppression release request to the input unit and the processing unit in an order that is stored in advance.

14. The method according to claim 10, wherein the sending of the operation suppression request includes sending the operation suppression request to the input unit and the processing unit specified in advance.

15. The method according to claim 10, further comprising receiving, by the input unit and the processing unit, the at least one process request for the at least one process specified in advance, in an operation suppression state after the operation suppression request is received.

16. The method according to claim 15, further comprising performing control, by the input unit and the processing unit, to not accumulate in duplicate those of the one or more process requests that are the same, with regard to the one or more process requests received during the operation suppression state.

17. The method according to claim 10, further comprising:
   receiving, by the input unit and the processing unit, the one or more process requests of the at least one process request for the one or more processes in an operation suppression state after the operation suppression request is received;
   accumulating, by the input unit and the processing unit, the one or more process requests of the at least one process request that have been received; and
   executing, by the input unit and the processing Unit, the one or more processes corresponding to the one or more process requests that have been accumulated, when the operation suppression release request is received.

18. The method according to claim 10, further comprising determining, by the input unit and the processing unit, whether the at least one process for which the at least one process request is received before the operation suppression request is received can be cancelled, and cancelling the at least one process that is determined to be possible to cancel, when the operation suppression request is received.

* * * * *